United States Patent [19]
Breitenbach et al.

[11] 3,711,691
[45] Jan. 16, 1973

[54] PERIPHERAL DEVICE ANALYSIS

[75] Inventors: Richard C. Breitenbach, Boulder; Gene H. Edstrom; James R. Keffeler, both of Longmont, all of Colo.

[73] Assignee: International Business Machines Corporation, Armonk, N.Y.

[22] Filed: May 13, 1971

[21] Appl. No.: 143,057

[52] U.S. Cl.........235/153 A, 179/100.2 B, 324/172, 340/172.5, 340/174.1 A
[51] Int. Cl..............................................G11b 27/00
[58] Field of Search........179/100.2 B; 340/174.1 A, 174.1 B, 340/172.5; 346/74 M; 235/153; 324/172

[56] References Cited

UNITED STATES PATENTS

| | | | |
|---|---|---|---|
| 3,320,600 | 5/1967 | Headrick et al | 340/174.1 B |
| 3,412,385 | 11/1968 | Wang et al. | 340/174.1 B |
| 3,575,658 | 4/1971 | Behr | 179/100.2 B |
| 3,576,584 | 4/1971 | Cone et al. | 340/174.1 A |
| 3,609,725 | 9/1971 | Simonsen | 340/174.1 B |

*Primary Examiner*—Charles E. Atkinson
*Attorney*—Hanifin & Jancin and Herbert F. Somermeyer

[57] ABSTRACT

A computer peripheral device having related mechanical and electrical functions such as a magnetic media transport is analyzed by combining tachometer signals indicative of a mechanical function with data signals from the electrical functions. Such data signals can represent formatting of data on the media while the tachometer pulses indicate capstan rotation used for media transport. In tape systems, data-signal formatting is usually generated by successive motions of the media.

58 Claims, 13 Drawing Figures

PERIPHERAL DEVICE ANALYSIS

DOCUMENTS INCORPORATED BY REFERENCE

1. USA Standard X3.22-1967, "Recorded Magnetic Tape for Information Interchange"(800 cpi, NRZI).
2. "Proposed American National Standard—Recorded Magnetic Tape for Information Interchange" (1600 cpi, Phase Encoded), Communications of the ACM, Volume 13, Number 11, Nov. 1970, pages 679–686.
3. U.S. Pat. No. 2,734,186 (phase-encoded recording).
4. U.S. Pat. No. 3,303,476 (digital interfaces).
5. U.S. Pat. No. 3,336,582 (CPU channel commands to control unit).
6. U.S. Pat. No. 3,372,378 (a switching system for a data processing system).
7. U.S. Pat. No. 3,400,371 (a CPU).
8. U.S. Pat. No. 3,550,133 (a channel).

BACKGROUND OF THE INVENTION

The present invention relates to peripheral device analysis and particularly to those peripheral devices recording digital data on a magnetic media, such as tape or strip, in predetermined formats.

The use of magnetic tape subsystems in data processing systems is widely accepted. Many of these systems record data signals in accordance with predetermined formats in NRZI and PE (phase encoded) recording schemes. Such data recording schemes have resulted in industry definitions on inter-block gaps between blocks of recorded data signals, access times, start-up times, and the like. Since such tapes are used on various tape units, variations in tape velocities between the units vary the record signal densities, length of data blocks, and the like. It is desirable to be able to analyze the effect of such variations on throughput and reliability.

In the higher performance tape drives, i.e., the machines which transport a magnetic tape or web past a transducing station or rotate a transducer past a tape, digital tachometers are used in connection with the driving motor. Signals supplied by the digital tachometer are indicative of motor performance. When one assumes there is no slippage between a driving capstan and the tape record media, then such tachometer signals indicate media displacement. As such units are used in the field, there is a natural degradation of components and hence performance. It is highly desirable that such degradation be pinpointed before there is a malfunction or error when the tape subsystem is operating with a central processing unit (CPU). To date, such effective analysis has been limited to mainly off-line diagnostics. It is highly desirable from an economy viewpoint to be able to analyze media drive performance, especially with respect to format generation for predicting possible future malfunctions as well as logging performance variations from time to time.

Another important aspect of tape drives is controlling the tape during capstan motion as to acceleration, velocity, and deceleration. Capstan motor systems supply a tachometer signal indicative of capstan rotation. Such signals are used in a velocity loop to operate the capstan driving motor, and hence, transport the tape at a constant velocity. In some tape record systems, especially video recorders, a "sync" track on the media yields timing signals which are supplied to the motor control system for added control. This arrangement requires a separate track on the media and, further, is still subject to the degradation noted above.

For improving reliability, availability, and serviceability of media or record member transport systems, such natural degradation as well as other detrimental variations of such transport systems should be more automatically analyzed with simplified analysis statements provided by the CPU in aiding maintenance personnel.

Other peripheral devices used with CPU's combine mechanical motions with electrical functions to effect desired signal processing incident to CPU operation. Such other peripherals include printers, typewriters, memory discs, memory drums, communication-related devices, and the like.

SUMMARY OF THE INVENTION

It is an object of the present invention to provide an improved peripheral device performance analysis.

In accordance with the preferred form of the present invention, tachometer (displacement indicating) signals are combined with data signals read back from a media having relative motion with respect to a transducer or operating member in accordance with such tachometer signals and analyzed for determining total drive performance. In a most preferred arrangement of the present invention, an I/O controller (CU) controls a plurality of tape drives or media transport devices. Each of the devices has a line supplying tachometer signals to the CU. Within CU, the signals read back from the various devices are combined and analyzed with respect to the respective tachometer signals. The analysis results are transferred to the attendant CPU (central processing unit) for further software analysis, malfunction prediction logging, and print out of instructions to maintenance personnel. The CPU may log the performance analysis for use in later diagnostics or may automatically print out possible malfunctions and future malfunctions in the media transport subsystem.

In other forms of the invention, devices connectable to a CPU combine mechanical and electrical functions to effect desired data or signal processing functions related to the CPU. By combining signals representing both functions, performance analysis of such devices is enhanced.

The foregoing and other objects, features, and advantages of the invention will be apparent from the following more particular description of preferred embodiments of the invention, as illustrated in the accompanying drawings.

The Drawings

Figure 7:
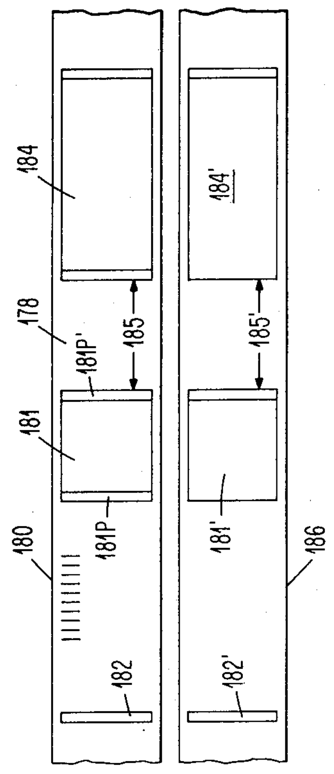

FIG. 7 diagrammatically shows two record formats used in recording.

Figure 8:
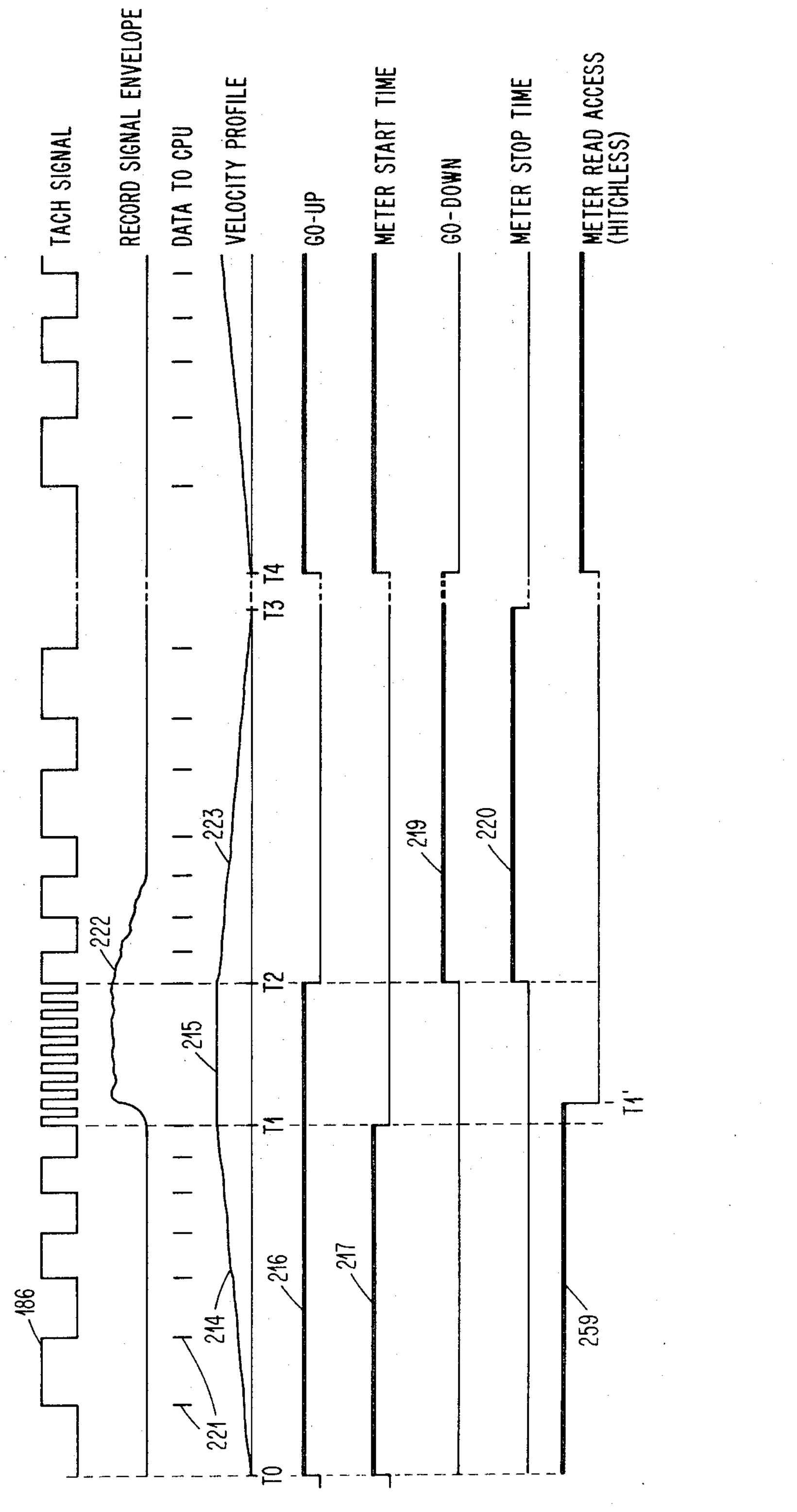

FIG. 8 is a DMR velocity profile graph showing velocity and signal relationships.

Figure 6X:
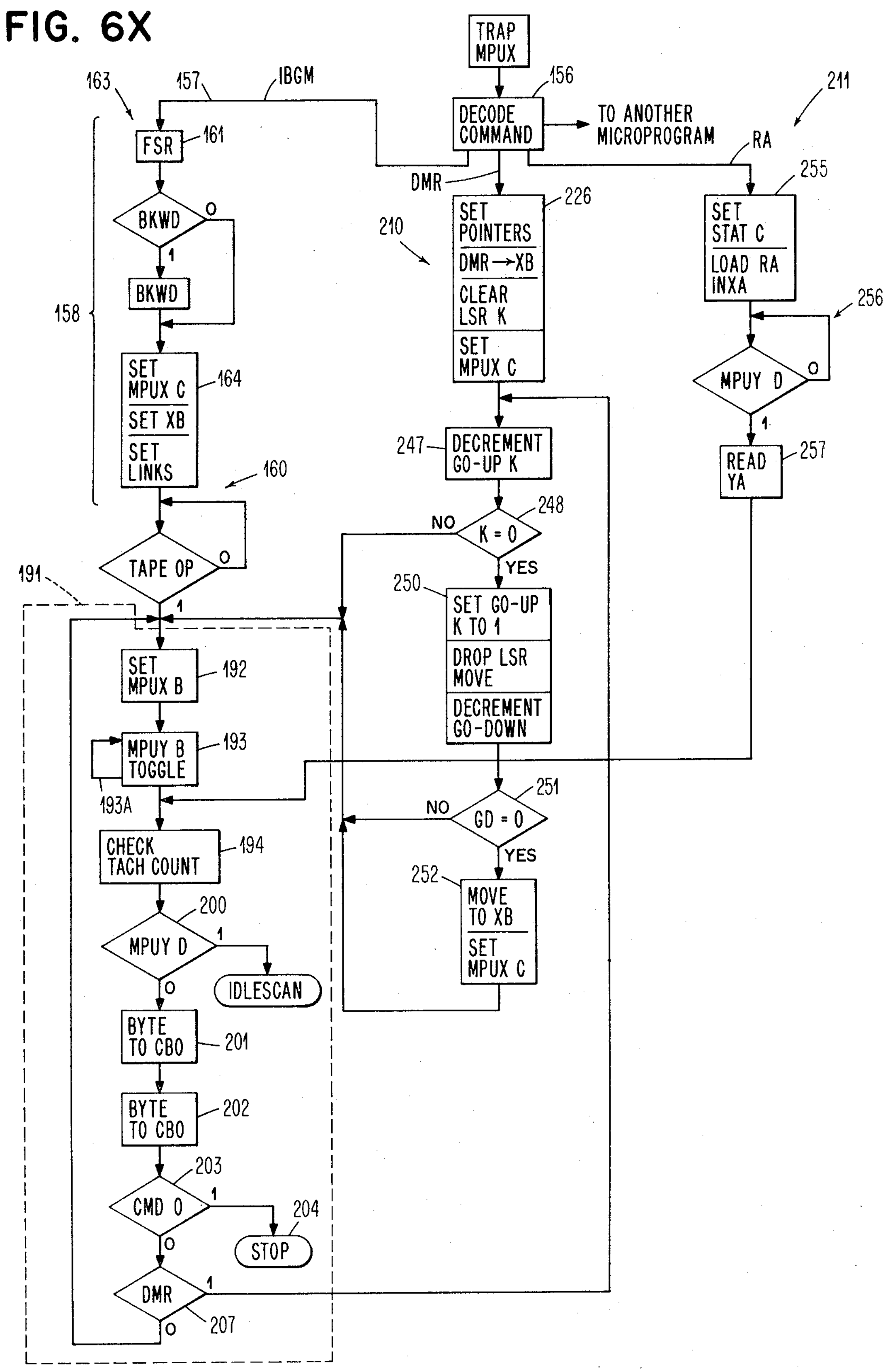
FIGS. 6X and 6Y are flow diagrams of microprograms for combining tachometer and readback signals from MTU for analyzing read access (RA), interblock gaps (IBG), and diagnostic measure read (DMR), respectively for MPUX and MPUY.
Figure 6Y:
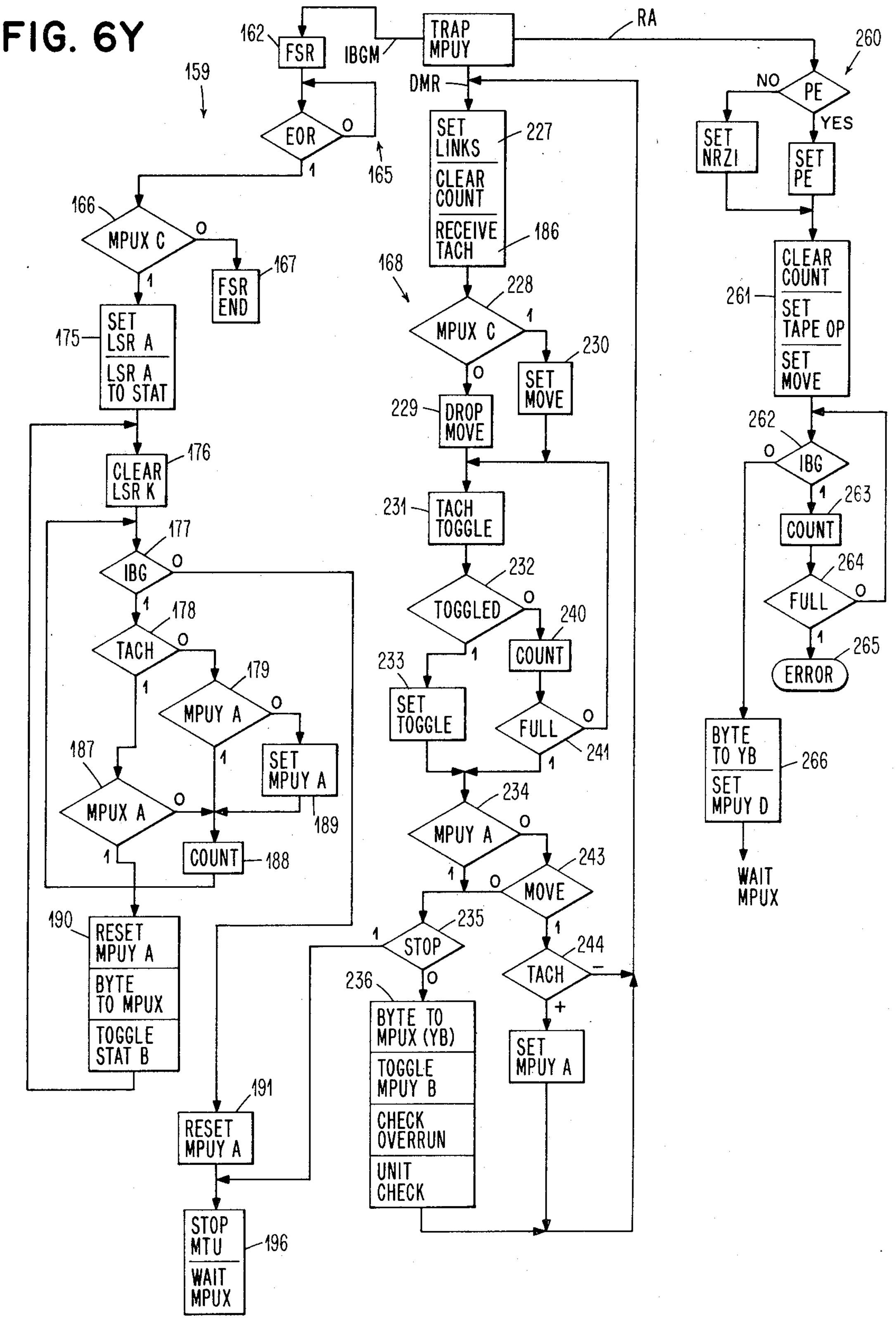
Figure 9:
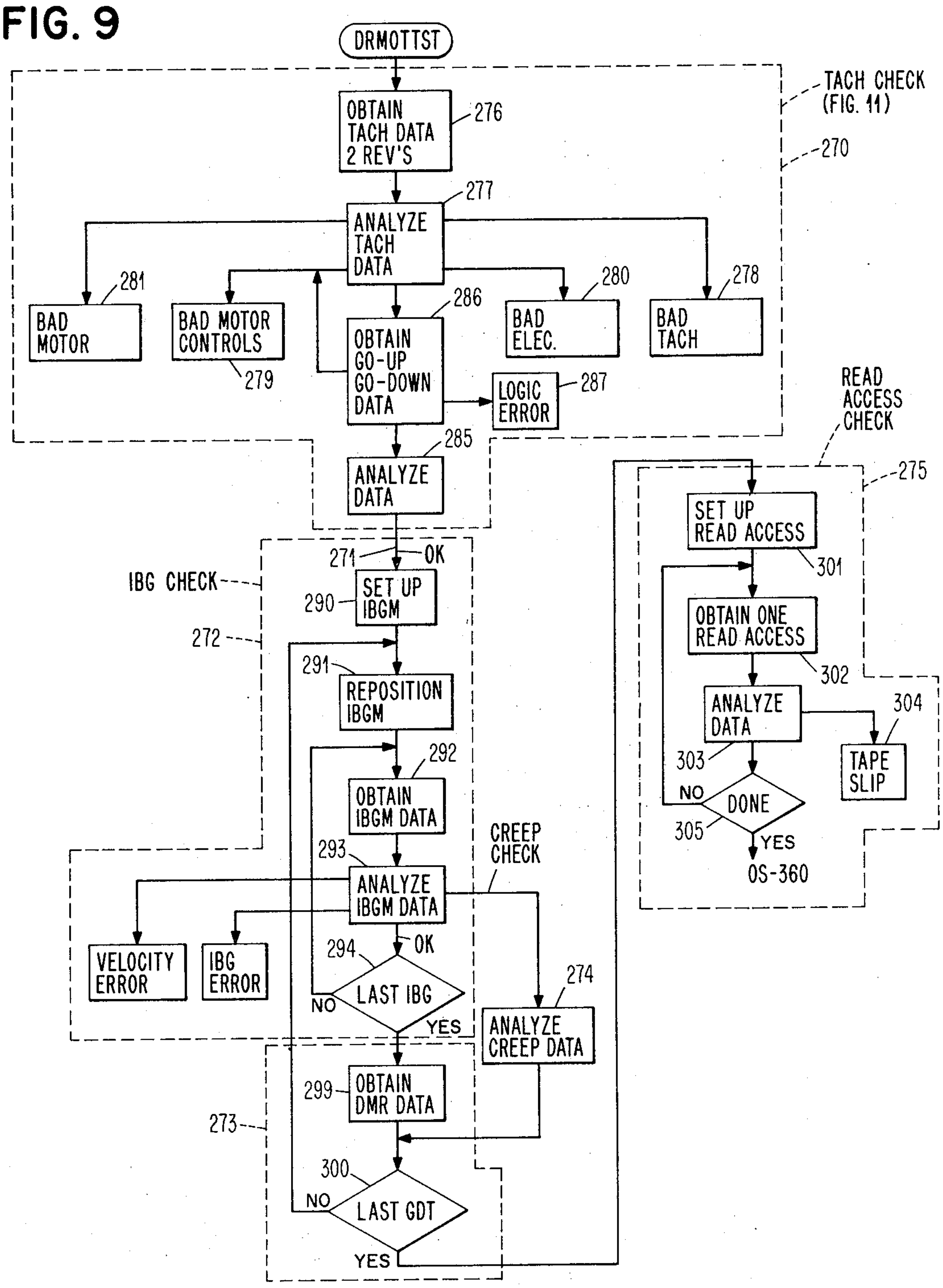

FIG. 9 is a simplified flow chart of a CPU program using the FIGS. 6X and 6Y microprograms for an exemplary diagnostic analysis in accordance with the present invention.

Figure 10:
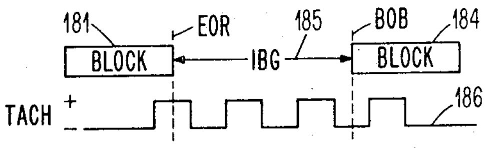

FIG. 10 is a simplified diagram showing metering of an IBG (IBGM).

Figures 11, 12:
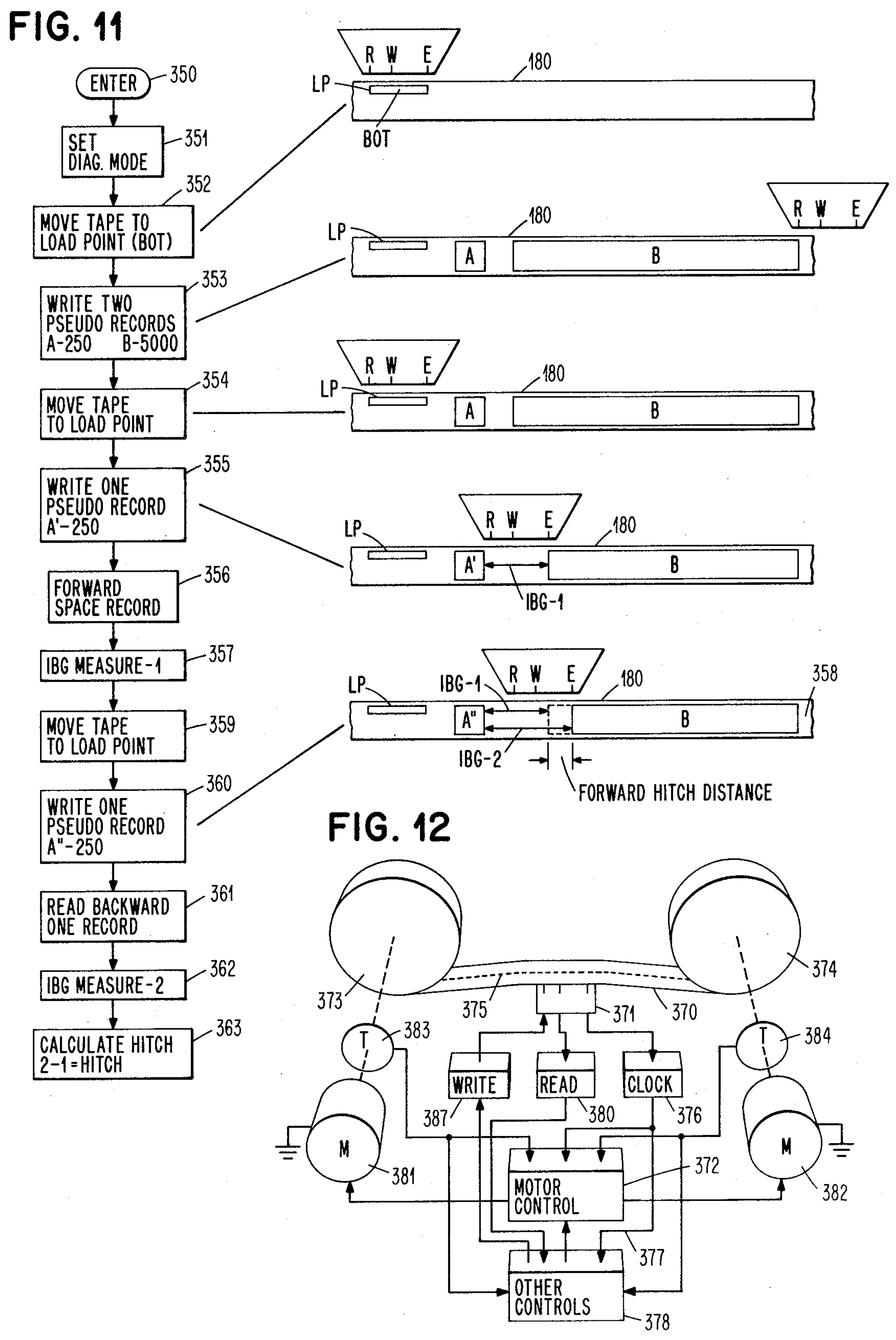

FIG. 11 is a simplified flow chart of a CPU routine and a diagrammatic showing of head-tape positions for diagnosing a forward hitch operation.

FIG. 12 is a simplified logical diagram of another signal processing subsystem using the present invention.

GENERAL DESCRIPTION

Referring now more particularly to the drawings, like numerals indicate like parts and structural features in the various diagrams.

Figure 1:
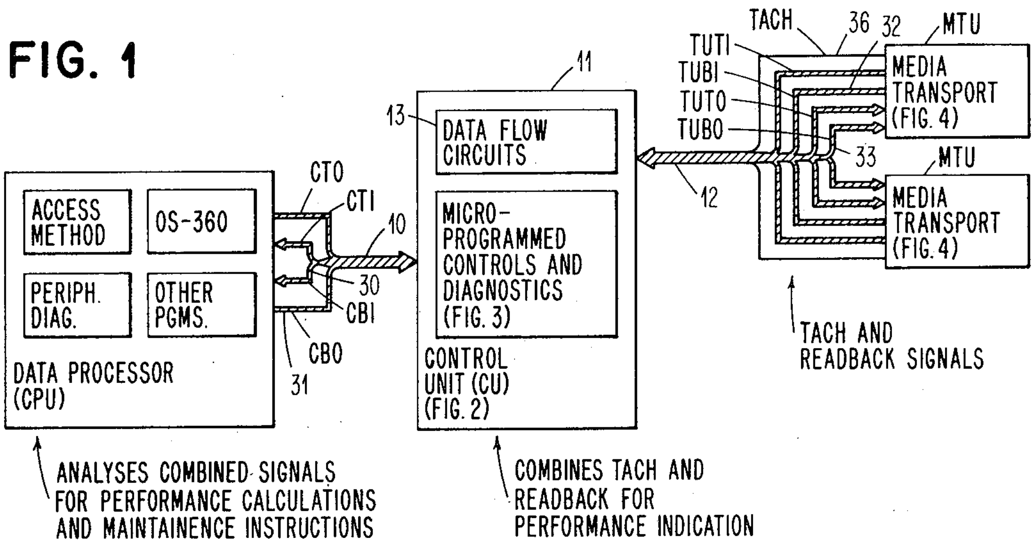
FIG. 1 is a simplified diagrammatic showing of the invention with legends associating functions with equipment for a preferred embodiment.

Referring particularly now to FIG. 1, an embodiment of the present invention is shown in simplified diagrammatic form. A central processor (CPU) is connected to I/O controller 11 via interface 10 which includes suitable cabling. Interface 10 has a channel bus out (CBO) over which is transferred bytes of data and commands. Next to CBO is a set of lines called channel tag out (CTO) which carry control signals for gaining attention of I/O controller 11 by the CPU. Further, the signals on CTO determine the interpretation of the bytes of signals supplied over CBO.

Communication from I/O controller 11 to CPU are via channel bus in (CBI). In a similar manner, channel tags in (CTI) carry control and special communication signals which gain attention of CPU circuits for handling signals to be transferred over CBI or to provide intercommunication timing sequences between I/O controller 11 and CPU. Generally, the design of the interface exemplified by interface 10 is shown in the Moyer et al. U.S. Pat. No. 3,303,476 and U.S. Pats. Nos. 3,336,586 and 3,550,133.

I/O controller 11 has a plurality of I/O devices attached thereto by cables 12 and controlled thereby for transferring data between an automatically selected I/O device and CPU. Shown in FIG. 1 is a pair of magnetic tape units (MTU) in which environment the present invention is described. The interface between I/O controller 11 and the various MTU's follows the design principles set forth in the Moyer patent supra. The bus out lines from I/O controller 11 to MTU's are labeled TUBO (tape unit bus out). The tag out lines are TUTO (tape unit tag out), while the incoming lines to I/O controller 11 are TUBI (tape unit bus in) and the tag lines are TUTI (tape unit tag in). Additionally, tach line 36, as later more fully described, carries tachometer signals from the addressed or activated MTU to I/O controller 11.

I/O controller 11, in accordance with the practice of the present invention, receives the tach pulses from line 36 as well as data representative signals from TUBI and combines same for performance indication of activated MTU. The results of such a combination by I/O controller 11 are supplied to CPU over CBI for analysis of the combined signals for performance calculations and the generation of maintenance instructions for increasing the reliability, availability, and serviceability of the activated MTU.

In accordance with this invention, combining readback signals and tachometer signals and the further analysis of such combined signals greatly increases the number of maintenance and diagnostic functions that can be performed in an activated MTU. This increased number of diagnostic functions enables the programmer of CPU and I/O controller 11 to exercise any addressed MTU to a greater degree than heretofore possible and, as a result, obtain more meaningful and more detailed performance data about MTU which is readily available through automatic means in I/O controller 11 and CPU.

In each MTU, tape is transported in coordinated action with electronic circuits recording or detecting signals on or from the tape. This coordinated action is automatically analyzed by combining the tachometer signals on line 36 with signals received over TUBI.

GENERAL DESCRIPTION OF TAPE SUBSYSTEM (TSS)

Figure 3:
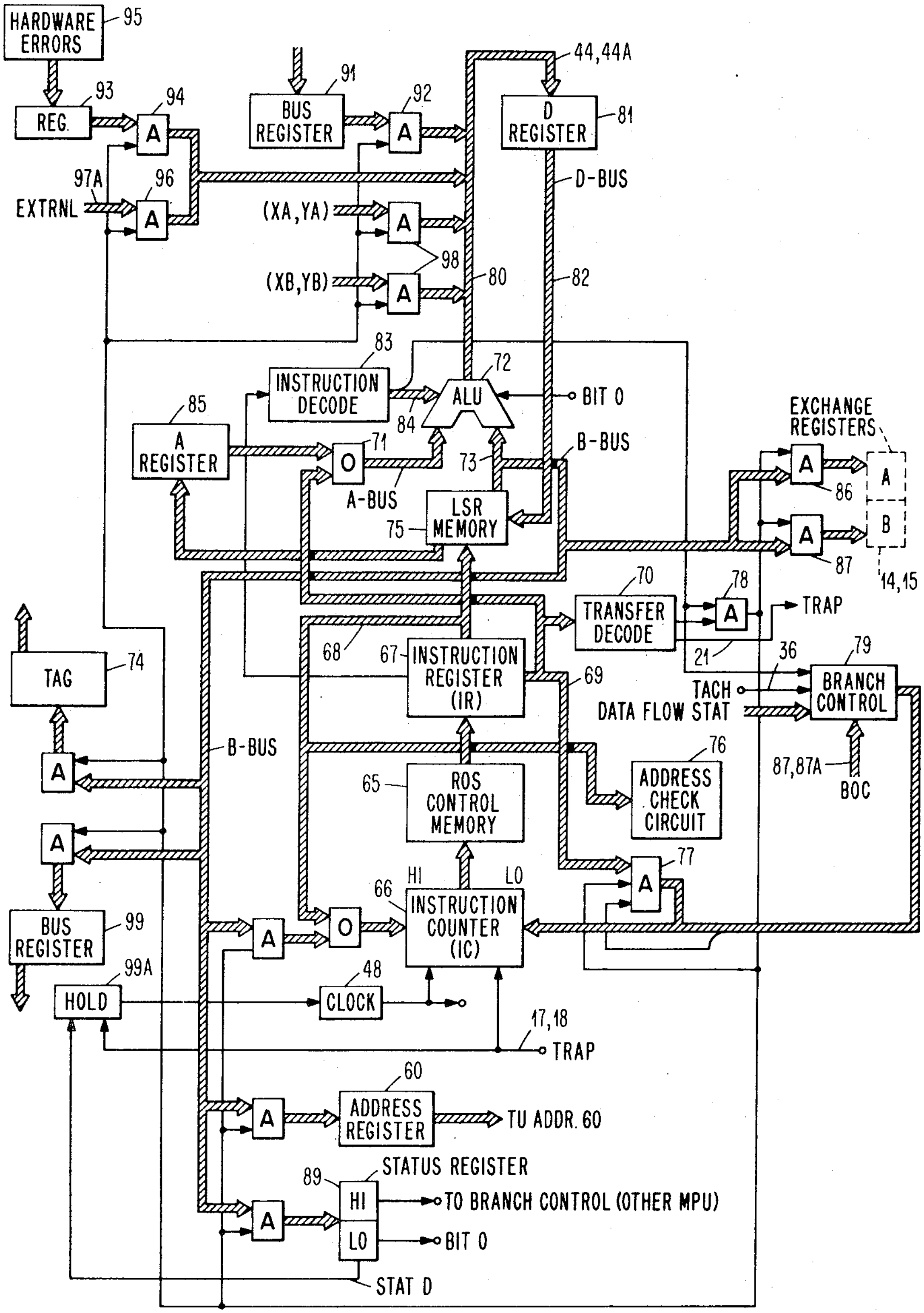
FIG. 3 is a simplified logic block diagram of a control unit (CU) usable in the FIG. 2 illustrated system.

I/O controller 11 is particularly useful with the type of channel described in the Moyer et al. U.S. Pat. No. 3,303,476. The description assumes a channel I/O controller interface usable with a channel of the type described in that patent. FIGS. 1 and 3 of that patent describe all tag signals used herein except SUPPRESSIBLE REQUEST IN which is defined with respect to MPUX (channel MPU) microprograms. It also assumes that the interface between the controller and the I/O devices follows a similar bus-out, bus-in, tag line arrangement. In addition to the functions described in the Moyer et al. patent supra, a tachometer input line is provided to I/O controller 11, as later described. Information handling system (IHS) interface X (INTFX) is the interface described in the Moyer et al. patent.

INTFX communicates with CPU channel via cable 10. The term CPU is hereafter used to include the channel portions of data processors. I/O controller 11 provides control for exchanging information-bearing signals between INTFX and interface Y (INTFY). INTFY is connected to one or more magnetic media devices via cable 12. Such I/O devices, for purposes of illustration only, are magnetic tape units capable of recording and reproducing information-bearing signals, inter alia, in phase-encoding (PE) and NRZI schemes.

I/O controller 11 has three main sections. MPUX is a microprogrammable unit providing synchronization and control functions between the I/O controller and INTFX. MPUY performs similar functions with INTFY. In a magnetic tape subsystem, MPUY provides motion control and other operational related functions uniquely associated with the described I/O device. The third section is data flow circuits 13, which actually process information-bearing signals between interfaces X and Y. Data flow circuits 13 may consist of entirely a hardware set of sequences and circuits for performing information-bearing signal exchange operations. In an I/O controller associated with a magnetic-tape recording system, such data flow circuits include writing circuits for both PE and NRZI, readback circuits for both encoding schemes, deskewing operations, certain diagnostic functions, and some logging operations associated with operating a magnetic tape subsystem.

Since MPUX and MPUY are independently operable, each having its own programs of micro-instructions, program synchronization and coordination is required. To this end, exchange register networks are provided. Each MPUY has its own output exchange registers; for example, MPUX has exchange registers 14 while MPUY has exchange registers 15. These registers receive output signals from the respective MPU's. The signals temporarily stored in these registers are supplied directly to data flow circuits 13 for effecting and supervising data flow and signal processing operations. This arrangement makes the data flow circuits 13 subservient to both MPUX and MPUY. Additionally, such signals are simultaneously provided to the other MPU—that is, registers 15 supplies MPUY output signals to MPUX and registers 14 supplies the MPUX output signals to MPUY. The respective MPU's under microprogram control selectively receive such signals for program coordination.

Figure 2:
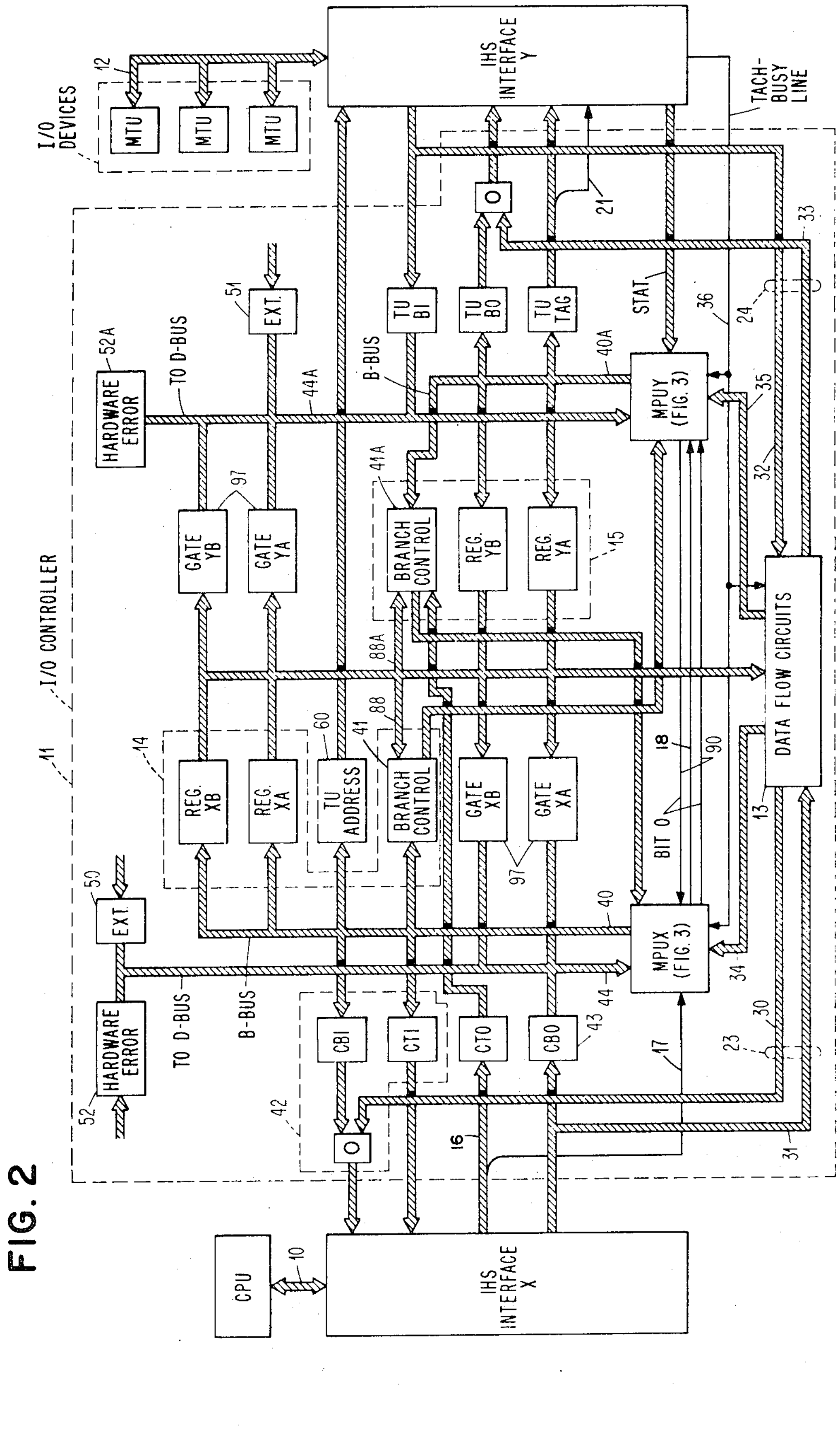
FIG. 2 is a simplified system diagram usable in the preferred embodiment.

INTFX is a controlling interface. It not only exchanges control signals with MPUX (CTO, CTI, CBO, CBI), but also has trap control line 17 (FIGS. 2 and 3). When this line is actuated, MPUX aborts all present operations and branches to a fixed address for analyzing signals on cable 16. These signals, simultaneously supplied over cable 16, force MPUX to perform INTFX selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals with devices via INTFY, also has trap line 21 for controlling an I/O device in a similar manner. All information-bearing signals are exchanged between interfaces X and Y through data flow circuits 13 via full-duplex cables 23 and 24.

Data flow circuits 13 have channel bus in (CBI) lines 30 and channel bus out (CBO) lines 31. Each set of lines has a capability of transferring one byte of data plus parity. Similarly, tape unit bus in (TUBI) lines 32 transfer signals to data flow circuits 13 and MPUY over INTFY. Tape unit bus out (TUBO) lines 33 carry information-bearing signals for recording in MTU's plus commands from MPUY and MTU addresses from MPUX. Status signals are supplied both to MPUX and MPUY over status cables 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. These include branch control register 41, register XA, and register XB. Output bus 40 is also connected to the channel exchanging registers 42. These registers are CTI and CBI. CBI is channel bus in, while CTI is channel tag in. CTI transfers the tag signals from I/O controller 11 to CPU as described in the Moyer et al. patent and other control signals for interface operations.

Additionally, channel bus out (CBO) gate 43 receives bytes of data from INTFX for data flow circuits 13 and for MPUX. Gates XA and XB similarly gate exchange signals from the MPUY exchange registers 15. Gate XA receives the control signals from register YA while gate XB receives exchange signals from register YB. CBI register is shared by MPUX and data flow circuits 13. The CBI lines over INTFX are multiplexed in accordance with the Moyer et al. patent. CTI supplies tags indicating what the bus in signals mean.

INTFY operates in an identical manner. Signals in TUBO (tape unit bus out) register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to INTFX request for service of an MTU to provide the MTU address over output line 40 into TU address register 60. INTFY transfers the TU address to all MTU's. The appropriately addressed MTU responds to MPUY that the selection is permissible or not permissible. If permissible, a connection is made; MPUY notifies MPUX via register YA. MPUX then completes the initial selection by responding to INTFX via CTI. Data processing operations then can ensue. A detailed description of this initial selection procedure is included for clearly showing the relationships between MPUX, MPUY, data flow circuits 13, and the two interfaces X and Y.

Microprogrammable Units (MPU's)

The MPU's contain microprograms which determine the logic of operation of I/O controller 11. MPUX contains a set of microprograms in its control memory designed to provide responsiveness and data transfers with INTFX. In a similar manner, MPUY contains a set of microprograms for operation through INTFY with the various MTU's. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which, in the illustrative embodiment, are constructed in an identical manner.

Referring more particularly to FIG. 3, an MPU usable in I/O controller 11 is described in a simplified block diagram form. The microprograms are contained in read only store (ROS) control memory 65. While a writable store could be used, for cost-reduction purposes, it is desired to use a ROS type of memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuit 71 to ALU 72. In ALU 72, such signals may be merged or arithmetically combined with signals received over B bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. AUL 72 has two inputs—the A bus from OR circuit 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuit 78 for selectively transferring signals within MPU.

ALU 72 has a limited repertoire of operations. Instruction decode 83 decodes four bits from the instruction word to provide 16 possible operations. These operations are set forth in the Instruction Word List below:

INSTRUCTION WORD LIST

| Op Code | Mnemonic | Function |
|---|---|---|
| 0 | STO | Store Constant in LSR, A set to 0 |
| 1 | STOH | Store Constant in LSR, Indexed Addressing |
| 2 | BCL | Match with Field 1, Branch to Addr in Field 2 |
| 3 | BCH | Match with Field 1, Branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | OO | Not used - illegal code |
| 8 | ORI | A OR'd with B, result stored in LSR 75 |
| 9 | ORM | A OR'd with B, result not stored |
| A | ADD | A plus B, sum stored in LSR 75 |
| B | ADDM | A plus B, sum not stored |
| C | AND | A ANDed with B, result to LSR 75 |
| D | ANDM | A ANDed with B, result not stored |
| E | XO | A Exclusive OR B, result to LSR 75 |
| F | XOM | A Exclusive OR B, result not stored |

In above list, the letter "A" means A register 85, "B" is the B bus, and the mnemonics are for programming purposes. The term "selected input" indicates one of the hardware input gates (92, 94, 96, 98) to the ALU output bus 80. The term "selected register" indicates one of the "hardware" registers in MPU. These include the interconnect registers 14 and 15 (FIG. 2), tag register 74, bus register 99, address register 60, and IC 66. Note that transfers from LSR 75 to these selected registers is via B bus 73. In FIG. 2, the B bus for MPUX corresponds to cable 40, while the MPUY B bus is cable 40A. Registers 14 receive signals via AND circuits 86 and 87. In MPUY, AND circuits 86 and 87 supply signals to exchange registers 15. Branch control 79 in FIG. 3 is the internal branch control. Branch controls 41 and 41A of FIG. 2 supply their signals respectively over cables 88 and 87A to the respective MPU's. These branch controls are separate circuits. Tag register 74 in FIG. 3 for MPUX corresponds to CTI register in the channel exchange registers 42. For MPUY, it corresponds to TUTAG register connected to INTFY. In a similar manner, bus register 87 for MPUX is register CBI in channel exchanging registers 42, while in MPUY it is register TUBO (tape unit bus out). Address register 60 of FIG. 3 corresponds to TU address register 60 of FIG. 2. MPUY address register 60 is not used.

Status register 89 has several output connections from the respective MPU's. It is divided into a high and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow. Bit 7 additionally is supplied directly to the ALU 72 of the other MPU's. The bits 0 and 4–7 are supplied to the data flow. Bit 7 additionally is supplied directly to the ALU 72 of MPUY as indicated by lines 90 in FIG. 2. This corresponds to a self-trapping operation which will be later described. Interpretation of the STAT bits is microprogram determined.

The signal-receiving portions of each MPU are in four categories. First, bus register 91 is designed to receive tags and data bytes for MPUX—this corresponds to CBO register 43 of FIG. 2. An MPUY bus register 91 is TUBI (tape unit bus in) register. AND circuit 92 is responsive to the transfer decode signals from circuits 70 to selectively gate bus register 91 to D register 81. From thence, the data bytes are supplied to LSR 75. Secondly, D register 81 also receives inputs from hardware error register 93 via AND circuit 94. Hardware error signals (parity errors, etc.) are generated in circuit 95 in accordance with known techniques. Thirdly, AND circuit 96 receives external data signals over cable 97 for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 are stored in LSR 75. If it is desired to output the results of the arithmetic operation, then another cycle is used to transfer the results from LSR 75 over B bus 73 to a selected output register such as one of the interchange registers or bus register 87.

In FIG. 3, the input to D register 81 is either cable 44 or 44A of FIG. 2. Hardware error circuit 95 and error register 93 of FIG. 3 correspond both to the hardware error circuits 52 and 52A of FIG. 2. External cables 97 receive signals from the external registers 50 and 51 respectively for the two MPU's.

AND circuits 98 of FIG. 3 correspond to the gates XA, XB, YA, and YB of FIG. 2.

Figure 5:
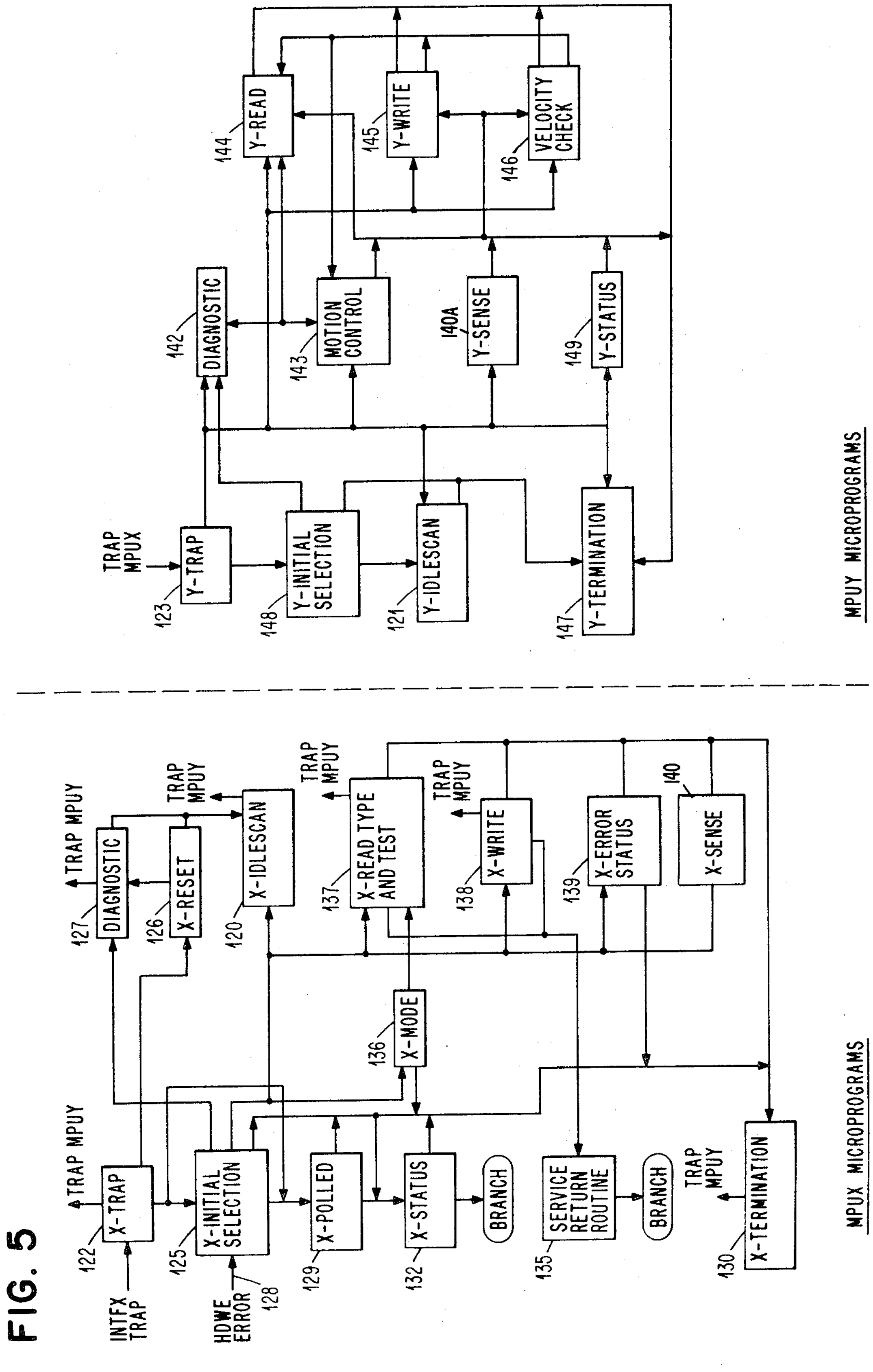
FIG. 5 is a diagrammatic presentation of microprograms (MP) used to operate CU.

Each MPU is trapped to a predetermined routine by a signal on trap line 17 or 18, respectively. The trap signal forces IC 66 to all zeroes. At ROS address 000, the instruction word initiates X-trap routine (FIG. 5) or Y-trap routine (FIG. 5). For reliability purposes, it is desirable to force MPUY to inactivity. This means that clock oscillator 98 is gated to an inactive state. During normal operations, clock 98 supplies timing pulses to advance IC 66 and coordinate operations of the various MPU's as is well known. Whenever MPUY has finished its operations, it sets STAT D in register 89. STAT D indicated MPUY has finished its operations as requested by MPUX. The STAT D signal sets hold latch 99A indicating that MPUY is inactive. Hold latch 99A gates clock 98 to the inactive condition. When MPUX traps MPUY, not only is IC 66 preset to all zeroes, but hold latch 99A is reset. Clock 98 is then enabled for operating MPUY.

General Description of MTU

Each of the plurality of MTU's is identically constructed. A typical MTU is shown in simplified diagrammatic form in FIG. 4.

Magnetic tape 100 is selectively transported past transducer or head 104 between a pair of tape spools 101 and 102 by capstan 103. Tape 100 forms a pair of bights in low inertia vacuum bins (not shown) for improving the acceleration and deceleration characteristics of the tape past head 104. In many magnetic tape units, such characteristics are very important for short access times and ensuring that magnetic tape 100 continually bears against head 104 for effecting desired transducing operations. A purpose of the present invention is to analyze the performance of each MTU in performing the transport of tape 100 past transducer 104. This is accomplished by analyzing the tachometer signals on line 36 supplied by the motor drive system 105 in combination with the signal read through head 104 and then processed by read/record circuits 106 and transferred over TUBI 32 and INTFY to I/O controller 11.

The tape driving system operating capstan 103 includes motor 107 actuated by motor control 108. A velocity set point is usually supplied to motor control 108. Such set point may be an oscillator or an analog voltage. Motor 107 has tachometer 109 supplying signals to shaper 110 which then supplies a square wave over line 111 indicating performance of motor 107. Tachometer 109 is preferably of the digital type—that is a disk or ring with a large plurality of light/dark areas for indicating rotational translation. A reflective tachometer may be used having alternate reflective and nonreflective areas. In any event, shaper 110 supplies a tachometer signal, preferably a square wave, over line 111 which is indicative of motor 107 performance as controlled by motor control 108.

Assuming no tape slip between tape 100 and capstan 103, tachometer signals on line 111 indicate translation of tape 100 past head 104. For selectively controlling movement of tape 100, control logic 112 is responsive to signals supplied by I/O controller 11 over TUBO and TUTO to supply a "go" signal over line 113 to motor control 108. When a "go" signal is supplied over line 113, motor control actuates motor 107 to move tape 100. As soon as the "go" signal is removed by control logic 112, control 108 actuates motor 107 to stop. The generation of the "go" signal on line 113, as well as direction (forward/backward) signals over line 113A, in response to signals supplied by I/O controller 11 are well known and are not further described for that reason.

Control logic 112 also actuates and controls read/record circuits 106 and may be in accordance with known techniques; such control is not further described for that reason. Control logic 112 sequences the outputs of sensors 114 to TUBI in response to command signals received from I/O controller 11 to supply what are usually termed "sense bytes" to I/O controller 11 which indicate that status of the respective MTU. Such sensors may indicate the location of tape 100, whether or not a pair of tape spools 101 and 102 are mounted in the MTU for proper operation, and the like. Read/record circuits 106 may include gating and other logic circuits in accordance with known techniques. In controlling the signals read back from transducer 104, AND circuits 115 selectively gate the partially detected signals in read/record circuits 106 through OR circuit 116 to TUBI 32 for transfer to I/O controller 11. I/O controller 11 continues the processing of such signals in data flow circuits 13. The control of AND circuits 115 is in accordance with command signals received over TUBO and TUTO from I/O controller 11.

While recording signals on tape 100, the data bytes to be recorded are supplied over TUBO 33 simultaneously with the move signal on TUTO, line 117, which commands logic 112 to supply the "go" signal over line 113. The data signals to be recorded are transferred directly to read/record circuits 106 for amplification and supply to transducer 104. I/O controller 11 coordinates the move command on line 117 together with the transfer of data bytes to be recorded over TUBO. The other two control lines in TUTO command and cause control logic 112 to receive the signals on TUBO 33 and decode same for causing functions to be performed in MTU in accordance with the signal permutations on TUBO. Such control or command signals may cause MTU to rewind the tape, transfer sense bytes from sensors 114 to TUBI, set up operations for transferring the signals from TUBO to transducer 104 or vice versa, etc.

Transfer of tachometer signals from shaper 110 and line 111 to tach line 36 may be under control of I/O controller 11. That is, any of the tag lines in TUTO being active are supplied through OR circuit 118 enabling AND circuit 119 to pass the tachometer signals to tach line 36. That is, any time the addressed MTU is receiving a tag line signal from an I/O controller, the I/O controller is instructing the MTU to transfer tachometer signals to such I/O controller. Of course, the I/O controller must be programmed and set up to receive and interpret such supplied tachometer signals. In the alternative, line 111 may be connected directly to tach line 36 such that any time motor 107 is activated, tachometer signals are supplied over line 36. In that arrangement, which is preferred in many applications, the I/O controller is programmed to receive such tachometer signals on a selective basis; i.e., program operated gates within controller 11 either inhibit or pass tachometer signals to appropriate evaluation circuits, as will become apparent.

In the former arrangement, AND circuit 119 enables tach line 36 to be used for supplying tachometer signals to I/O controller 11 during MTU operations. When MTU is not busy, a not busy signal is generated by control logic 112 and supplied over not busy line 150 through OR circuit 151 to tach line 36. In the latter instance, I/O controller 11 sharing a particular MTU with another I/O controller can sense line 36. If a predetermined static voltage appears thereon, the interrogating I/O controller will know the MTU is available and then can select same for data processing, diagnostic, or other operations. However, if tachometer signals are being supplied over line 36 by the addressed MTU, then the interrogating I/O controller (not shown) knows the MTU is being used by another I/O controller; and it will then branch to other operations. This latter arrangement is useful in complex data processing systems wherein a plurality of I/O controllers are connected to a larger plurality of MTU's and also to a plurality of CPU's.

Microprogramming Generally

FIG. 5 shows general relationships between the micro-routines of MPUX and MPUY. This showing is greatly simplified to give a general impression of how the micro-routines cooperate to perform I/O controller functions. Many of the functions performed by these micro-routines have been performed before in other I/O controllers, usually by hardware sequences. Some micro-routines of lesser importance to the present invention have been omitted for clarity. The described routines were selected to illustrate the operating relationships of MPUX, MPUY, data flow circuits 13, MTU's, and CPU in evaluating MTU performance by combining tachometer and readback signals from such MTU.

X idlescan 120 and Y idlescan 121 monitor pending status, interrupt status, and provide intercommunication between the two MPU's for ascertaining the availability of devices connected to INTFY. X idlescan 120 includes trapping MPUY via Y idlescan 121 for polling INTFY to determine availability of an MTU addressed by INTFX. Included in X idlescan is a wait routine which idles MPUX until trapped by INTFX. INTFX traps MPUX to ROS 65 address 000. At MPUX ROS address 000, X-trap 122 begins. During the execution of X-trap routine 122, MPUY is trapped to ROS address 000 to later execute Y-trap routine 123. In X-trap 122, CTO is sensed for initial selection. If the initial selection tag is active, X-trap routine branches the microprogram to X-initial selection 125. If there is no initial selection, then either X-reset 126 or an ALU diagnostic within diagnostic 127 is performed. Upon completion of these functions, X idlescan 120 may be re-entered to complete MTU scanning operations. Initial selection 125 is responsive to certain hardware errors received at 128 (sensed as described with respect to FIG. 3) to stop I/O controller 11 for indicating detected hardware errors. A primary function of initial selection 125 is interrupt processing, as described later with respect to FIG. 8, et seq.

During an initial selection, X-polled 129 is entered to further identify the INTFX request. Also, certain branch conditions are set up in LSR for use later by X-termination 130. MTU address verification may be performed. Upon completion of the branch setups, the X-polled 129 initiates X-status 132. X-status 132 activates CTI to send tag signals to INTFX indicating controller status in response to the previously received INTFX request. Based upon the branching set up in X-polled 129, the microprogram execution may follow several routes. These primarily end up in X-termination 130 which terminates the MPUX operation. MPUX then scans for further interrupts. With all scanning completed, MPUX waits for further instructions from INTFX.

Another important routine is service return (SERVRTN) 135 used in conjunction with INTFX for timing and control purposes during data transfers. The operation of the above-referred-to data channel operation in Moyer et al is implemented by service return 135. Another possible routine entered from initial selection 125 is X-mode 136, which determines the mode of operation in the controller in response to INTFX CMDO (Command Out) signals. X-read type and test 137 is entered in the event the initial selection results in a read operation. X-read type and test 137 traps MPUY to predetermined addresses, as later explained, for initializing a read operation in MPUY. In a similar manner, X-write 138 is entered and also traps MPUY to another subroutine for initializing a write operation. Error status 139 transfers error information through INTFX to CPU. This routine is closely associated with initializing I/O controller 11 for read or write. Senses 140 and 140A are entered in response to a sense command. Sensing transfers sense bytes to CPU for analysis. X-termination 130 also traps MPUY in connection with the selecting activated MTU's and for performing other functions in connection with terminating an operation previously initiated through INTFX as will be described. MPUY micro-routines respond to MPUX micro-routines for controlling various MTU's via INTFY. These micro-routines also transfer information control signals from INTFY to MPUX for retransmittal to INTFX. Upon being trapped by MPUX, Y-trap 123 obtains an MPUY ROS address from XB register and then branches to that address. Such ROS addresses are the first instruction address of several MPUY microprograms. For example, one address initiates diagnostic 142. Diagnostic 142 may initiate one of several microprograms of FIG. 5 for effecting operations in CU 11 or an MTU for diagnostic purposes. Such program connections are not shown.

On the other hand, Y-trap routine 123 may branch to Y-initial selection 148 to initialize MPUY for activity set forth in additional control signals from MPUX in registers 14. This may include an initiation of status 149, termination 147, or Y-idlescan 121. The MTU operating routines 143–146 may also be initiated from initial selection 148. As will become apparent, in addition to exchanging control signals via registers 14 and 15, status information is freely exchanged between the two MPU's for microprogram coordination. This discussion is followed by a similar discussion of MPUY microprograms. Finally, a discussion on the relationship of data flow circuits 13 responsiveness to the microprograms completes the description.

Microprogrammed Controlled Performance Measurements

Microprogrammed operation of CU 11 for measuring performance of an MTU is controlled by diagnostic routine 127 (FIG. 5). CPU sends a channel command to CU 11 which is decoded and effects the hardware trap into routine 122 which then causes the microprogram to branch to diagnostic routine 127 illustrated in FIG. 6X. It is understood that there may be more diagnostics resident in CU 11 than is shown in FIG. 6X. For the present description, there are three possible diagnostics—IBG (interblock gap) measure, read access (RA), and DMR (diagnostic measure read).

CU 11, after acknowledging receipt of the command from CPU, sets up MPUX LSR 75 in link registers 1, 2, and 3, respectively, for SVCO, CMDO, and halt I/O (HIO) response pointers. These pointers direct the microprograms in MPUX to the appropriate microprograms as generally discussed by J. W. Irwin in his copending application, Ser. No. 077,088, now U.S. Pat. No. 3,654,617, commonly assigned. The microprogram decodes the channel command at 156 by first checking whether or not it is a diagnose command from CPU. If not, other microprograms not further described are entered. If it is a diagnose command, i.e., diagnostic, then the microprogram in step 156 first determines the type of diagnostic. CU 11 then executes one of the three following described microprograms for effecting a CPU commanded measurement.

The beginning of block (BOB), end of record (EOR) format signals derived from the readback signals in accordance with known signal processing techniques in CU 11 are format check points between data blocks and IBG's. As such, in accordance with the invention, these BOB and EOR format signals are used as performance check points.

IBG Measure (IBGM)

For an IBGM, the microprogram follows line 157 to execute subroutine 158 and then enters wait loop 160 indicating that an IBG is ready to be measured. The functions performed in routine 158 in a forward IBGM (media moving in forward direction) is to forward space one record (FSR). This action initiates tape movement past transducer 104 for measuring an IBG downstream from the record being spaced over. Usually, a forward space record (FSR) moves the tape from a head position in one IBG forward to the next downstream IBG. In the IBG measure, this function is used to initiate the IBG measure with the FSR being aborted before a stop is initiated. The next downstream IBG is measured, and then the following downstream record is passed over with the tape resting in the next following downstream IBG. The IBGM data is transferred to CPU by micro-routine 191.

Referring momentarily to FIG. 7, the tape is initially positioned such that the transducer resides between tape mark 182 and preamble 181P of first record 181. The FSR command causes the tape to move under the transducer such that record block 181 is being read. Normally in an FSR, the tape is stopped such that the transducer will reside in IBG 185. However, in an IBGM, postamble 181P′ or end of record (EOR) is detected with the distance to BOB of the next record block 184 being measured as IBG 185. After IBG 185 has been measured, the tape is transported until the transducer is in transducing relationship with the next downstream or forward IBG. This action can be repeated for a plurality of IBG's without stopping the tape.

Returning now to FIG. 6X, the microprogram in MPUX first issues a FSR command to MPUY at step 161. This is accomplished by inserting a MPUY ROS address into register XB and setting STAT C. MPUY responds to STAT C to fetch the ROS address from register XB and then executes its FSR routine 162 (FIG. 6Y), This routine sends command signals to the addressed MTU causing it to do a FSR. While MPUY is initiating the FSR in the MTU, MPUX checks whether or not a backward operation is to be performed. In steps 163, a branch operation is based upon the backward bit in LSR which would have been received from CPU. If a backward space is to be performed, then the backward bit is set in XB; and MPUY is forced to fetch the backward bit and enter a BSR (backward space record) by causing MTU to move the tape backward rather than forward. However, for purposes of discussion, we are assuming that all tape motions for IBGM are in the forward direction. After checking backward, MPUX then performs step 164 setting MPUX STAT C telling MPUY that a diagnostic operation is being performed. STAT C is interpreted by MPUY differently in different microprograms in accordance with known design and programming techniques.

MPUY idles in micro loop 165 waiting for EOR (end of record). This corresponds to the time tape 178 is moving under the transducer, either in the blank space between tape mark 179 and first record 181 or over the end of record 181. An EOR signal is generated in data flow circuits 13 at the end of postamble 181P. Generation of such a signal and its meaning is well understood from different tape subsystems. The EOR signal causes MPUY micro-routine to proceed to branch operation 166. Here, MPUY checks the MPUX STAT C. If the STAT C has not been set, i.e., a normal FSR was being performed, then MPUY branches to normal FSR ending routine 167. That is not further described.

For diagnostics, MPUX STAT C has been set; and MPUY proceeds to load its STAT A in an "image" register in its LSR at step 175. MPUY then proceeds to measure the IBG sending distance information to MPUX for retransmittal to CPU each time the tach signal on line 36 from MTU undergoes a positive-going transition. In this regard, STAT A in LSR is used to track the polarity of the tachometer signal. Every time the tachometer signal is positive, STAT A is a binary 1; and when the tachometer signal is negative, STAT A is 0. As will become apparent, STAT B in both MPUX and MPUY is used to transfer tach signal information from MPUY to MPUX.

Tachometer signal measurement and its relationship to IBGM is better understood by referring to FIG. 10. IBG 185 extends between record signal blocks 181 and 184. Tachometer signal 186 is monitored to indicate the IBG 185 distance. EOR of block 181 happens to occur in the middle of a positive portion of tachometer signal 186. Data is transferred from MPUY to MPUX and thence to CUP at the first and every positive-going transition or BOB. As shown in FIG. 10, such data will be transferred three times.

The measurement technique used by MPUY microprograms is shown in FIG. 6Y. After setting STAT A in LSR, the STAT A is transferred to the STAT register 89 for internal use by MPUY. At the same time, the counter in LSR is cleared to all zeroes in preparation for IBGM to the first-occurring positive transition. In decision step 177, the IBG is checked to see if it is still present. The IBG indication is a latch (not shown) in data circuits 13 which is set by EOR signal and reset by the BOB signal. If IBG is a one, we are still measuring IBG 185. Next, in step 178, the polarity of the tachometer signal 186 is detected. Initially, signal 186 is positive; therefore, a binary 1 is detected in step 178. Next, STAT A is checked. Since it was set in step 176, the STAT A in register 89 is reset; and a byte (all 0's) is transferred to MPUX. This transfer is effected by loading the YB register and setting the B STAT. Then, in step 176, clearing the LSR counter is again performed. The sequence then follows steps 177 and 178 to 187. Since MPUY STAT A has been reset, step 188 is performed; and the count loop is entered. The count loop consists of repeating steps 177, 178, 187, and 188 until the tachometer signal goes negative as indicated by detecting a binary 0 in step 178. Then, step 179 is performed. Since STAT A had been reset just before transferring the byte of data to MPUX, STAT A is set in step 189 preparing for the transfer of a byte of data at the next detected positive transition of the tachometer signal 186. Count step 188 is performed; and the count loop is modified to include steps 177, 178, 179, and 188. Upon detection of a positive transition by the tachometer signal being a 1 in step 178, 187 is again performed; and step 190 is performed transferring the byte of data to MPUX and resetting STAT A.

From the above description, it is seen that steps 187, 179, and 189 perform a program toggle which follows the polarity of a tachometer signal as detected in signal 178. Similar arrangements are later referred to as a "-toggle program step".

Upon detection of BOB, the IBG latch (not shown) is reset. Then in step 177, the counting loops, as above described, are terminated by exiting to step 191 wherein STAT A is reset and the LSR STAT A image is reset. Then, in step 192, MTU is stopped; and MPUY waits MPUX.

An alternative IBGM is to exit step 190 to step 175. In this arrangement, all 0's are repeatedly transferred to MPUX until the first positive-going transition. Counting is then in phase with the tachometer signal with the first portion of the IBGM being discarded.

The corresponding MPUX program for transferring the measured bytes to each CPU is in subsequence 191. MPUX merely coordinates with MPUY in transferring the bytes of data to CPU. Upon detecting a TAPE OP in wait loop 160, MPUX enters routine 191. TAPE OP is a signal generated in MTU and lodged in CU 11 indicating that MTU is operating. First, the microprogram sets MPUX STAT B in step 192. It then performs an MPUY STAT B program toggle step at 193. MPUX wait loops over line 193A until STAT B is toggled by MPUY; MPUX then proceeds to step 194. Remember, when the byte was transferred to MPUX, MPUY STAT B was toggled in step 190. Wait loop 193A corresponds to count loops 188, 177, 178, and 179 in FIG. 6Y.

After verifying that the count between two successive positive transitions in tach signal 186 are not excessive, MPUX microprogram 191 checks for STAT D of MPUY at step 200. If STAT D is set, MPUY is informing MPUX that its operation has been completed. In the event STAT D is set, MPUX exits to termination routine 130.

If STAT D is not set, which is the normal situation, the bytes of data received from MPUY are transferred to CPU in steps 201 and 202. Because of the maximum distance between two successive positive transitions at the start of the later-described tests, two bytes of data are required to ensure that the modulus of the count is not exceeded. The transfer of the byte to CBO, and thence CPU, is in accordance with known SVCO/SVCI control signal exchanging techniques. After the bytes have been transferred, MPUX checks for CMDO at step 203. CMDO received from CPU indicates that IBGM is to be terminated. Detection of a BOB also terminates IBGM. When CMDO is received, MPUX exits to stop routine at 204. Referring back momentarily to FIG. 6Y, MPUY will stop the MTU as soon as IBGM has been completed. This action is independent of MPUX. In the event CPU desires to abort IBGM, CMDO being received early will cause MPUX to indicate "stop" to MPUY in accordance with known and previously described trap operations.

Usually, CMDO will be 0 (not CMDO) such that MPUX determines whether the microprogram is a DMR or an IBGM in step 207. If it is a DMR, then the DMR routine is entered; however, if it is an IBGM, routine 191 is repeated by re-executing step 192 in the above-described sequence. Routine 191 is the data transferring routine for IBGM, the DMR routine 210, and the read access routine 211.

Diagnostic Measure Read (DMR)

When MPUX decodes DMR command at step 156, the function illustrated in FIG. 8 is performed by MTU under direction of microprogram 210. The DMR microprogram 210 will be correlated with the signals A minimum go-up count was transferred to MPUX from CPU with the command decoded at step 156. That count is decremented once at 247. Then, at 248, it is checked as to whether or not the count in LSR is zero. If not, routine 191 (previously described with respect to IBGM) is entered. This routine effects transfer of the byte count from MPUY to CPU through the use of the B STAT toggling. Upon reaching step 207, the DMR is detected; and step 247 is reperformed decrementing the count until the count is zero. When the count reaches zero, the above-mentioned endless loop is entered waiting for CMDO. In this endless loop, step 250 sets the go-up count to one in LSR 75. Move bit is erased. The go-down count is decremented. Then in step 251, the go-down count representing the distance between T2 and T4 is checked for zero. As long as it is not zero, step 252 is bypassed; and routine 191 is entered directly. As soon as the go-down count is equal to zero, a move command is sent to register XB for MPUY; and STAT C in register 89 is set. Then, routine 191 is entered. These last few steps place the control and termination of DMR directly under CPU control. How CPU effects the setup and control of the just-described DMR routine is described with respect to FIG. 9.

Read Access

Another important operation performed by the MTU's is to rapidly access data blocks from a tape stop position to a tape full-velocity operating condition. Generally, access times should be in the order of milliseconds in a tape movement of less than one-half inch. In higher performance MTU's, the read access time and its reliability are extremely important to maintaining the desired high performance.

In FIG. 6X, MPUX decodes the read access (RA) command at 156. It then proceeds to step 255, which sets MPUX STAT C in LSR 75 and in register 89. Then, the RA ROS address for MPUY is loaded into XA register; STAT B is set; and the MPUY fetches the RA ROS address based upon its idlescan routine. After initiating MPUY, MPUX at 256 waits for MPUY STAT D to be set to a one. This signifies that MPUY has completed its operation. As soon as STAT D of MPUY is set, MPUX then reads register YA at 257 and enters routine 191 beginning with step 194. Since MPUY STAT D has been set, it merely checks the tach count at 194 and then enters IDLESCAN from decision step 200. CPU then must request transfer of the bytes of data obtained by CU 11 during the RA microprogram.

Referring next to FIG. 6Y, the MPUY RA microprogram is described. This MPUY microprogram can be understood from a functional viewpoint in FIG. 8 wherein heavy line 259 represents the RA time from time T0 until the readback signal 222 reaches a predetermined amplitude at time T1', which is somewhat after time T1 when MTU has caused its tape to reach operating velocity.

The first portion of the RA microprogram determines whether PE or NRZI tape is being used for the RA measurement. This is important to determine because the PE format requires a preamble and postamble, whereas NRZI does not. In step 260, the PE branch is made based upon the conditions determined by data flow circuits 13. Data flow circuits 13 respond to the format shown on the tape in FIG. 7 to set a PE latch or have it reset, depending on whether PE or NRZI has been detected. The CPU issues commands to CU 11 and thence to the MTU for making this determination. This is well known and not further described for that reason.

Then, MPUY at 261 clears its LSR 75 counter (registers 14 and 15), sets the tape operation latch in data flow circuits 13, and then sets the MOVE tag to MTU that was addressed via TUTO. Then, in step 262, it determines whether or not the tape in the addressed MTU is still positioned such that an IBG is adjacent the readback head. A count loop consisting of decision step 262, counting function 263, and threshold step 264 effects a count at a certain rate until the BOB is detected. If the counter exceeds a predetermined threshold, an error is indicated at 265 indicating that the RA is too long, i.e., performance has been degraded; therefore, this message may be printed out by the CPU such that maintenance personnel can correct the situation.

The count continues until the BOB resets the IBG latch (not shown). At this time, step 266 is performed wherein the byte of measurement data generated by count step 263 is transferred to interchange register YB; and MPUY STAT D is set informing MPUX that the RA measurement has been completed. MPUY then waits MPUX.

In this regard, the count is performed at a predetermined frequency determined by the cycle time of CU 11. The CPU, in receiving the byte count, will merely multiply the count times the programmed elapsed time between successive counts to determine the actual RA time.

CPU Program for Tape Performance Analysis

CPU can be any programmable machine operable by coded programs generated through assemblers, compilers, and the like. As shown in FIG. 1, the resident executive program is OS–360 using an access method for transferring information from the tape subsystem to the internal programs in memory of CPU. It also contains other programs as well as peripheral diagnostic programs which are the subject of the ensuing discussion. FIG. 9 is a simplified flow chart of a suitable CPU program for exercising any of the MTU's via CU 11 and its microprograms. The exercise is started by first determining the quality of the tachometer system by analyzing tachometer signal 186 (FIG. 10) via subroutine 270. If the tachometer checks out okay at 271, then the IBG measurement is performed by subroutine 272. In CPU, the diagnostic program can check for IBG length errors plus velocity errors. After a successful IBG measurement, DMR 273 is performed. This subroutine is relatively simple since the DMR sequencing is then primarily by the above-described microprograms. Additionally, creep analysis is provided at 274. After a successful DMR or creep analysis, RA routine 275 is performed. If everything checks out, the program returns to OS–360.

Upon the detection of any error in any of the above-mentioned subroutines, the diagnostic program branches to a logging program (not described nor illustrated) which logs the type of error. Based upon design choices, the logging of an error can abort further testing until appropriate maintenance or adjustment has been provided. As described in this specification, the and performance indicated in FIG. 8. As will be later explained, CPU in initiating DMR does so for a predetermined number of measurement bytes. This number should be selected such that the addressed MTU can be caused to reach operating velocity from a time TO to some time before time T2 as shown in FIG. 8. The byte counting is performed within CPU as later explained. The velocity profile 214 represents a response of the addressed MTU during the DMR execution. At time TO, the MOVE tag and direction (forward or backward) from MPUY is forwarded to the addressed MTU. The MTU immediately starts accelerating the tape toward operating velocity indicated by level portion 215 corresponding to the go-up time 216. The time is not necessarily represented in CU 11 as a signal. The start time represented from TO–T1 is represented by line 217 heavy portion.

At time T2, the go-up 216 is dropped; and a go-down 219 is activated. At time T3, the addressed MTU has come to a stop. Since the go-down byte count is not completed, the MTU remains stopped until time T4. A third portion of the byte count is then used for measuring a second go-up time for repeating the velocity profiling. This can be repeated as many times as desired. The stop time is indicated by heavy portion of 220.

Some MTU's have a feature termed "go hold-over." When MOVE on line 117 (FIG. 4) is deactivated, a time-out circuit (a monostable multivibrator, for example, not shown) is set to the active condition maintaining a "go" condition in MTU for the time-out period. The present invention can easily measure that function by counting tachometer signal state changes and relating same to the desired time-out period.

In DMR, byte counts (the elapsed time between successive transitions) are forwarded to the CPU at each tach signal 186 transition. The data forwarding times are indicated by the carets 221. A typical readback record signal envelope 222 is shown for illustrative purposes. It should be noted that the readback amplitude decreases as the velocity profile decreases along slope 223. This will occur whenever the readback is a function of the rated change of flux sensed by the transducer. Some transducers are independent of tape velocity; and in such situations, the readback signal envelope amplitude would not decrease. The variation in velocity is shown by the variation in the periodicity of tach signal 186. For purposes of simplicity and clarity, the number of cycles of tach signal 186 required to accelerate MTU has been reduced. The proportion of rate of change can be considered as typical for an MTU operating at 150 inches per second (ips).

Returning now to FIG. 6X, the MPUX microprogram 210 for setting up and operating DMR is explained. The first step 226 sets up program pointers as is generally done in a program such that it can branch to the appropriate places. Then, the counter in LSR 75 (FIG. 3) is cleared to all zeros. As in the other measurement routines, counters are two bytes long and consist of registers 14 and 15 in LSR. Then, the DMR command is transferred to XB for receipt by MPUY. STAT C is set informing MPUY that a diagnostic operation is being performed in accordance with the DMR information in XB. The STAT B is set in register 89 (FIG. 3) of MPUX informing MPUY to fetch the DMR command from XB.

Figure 4:
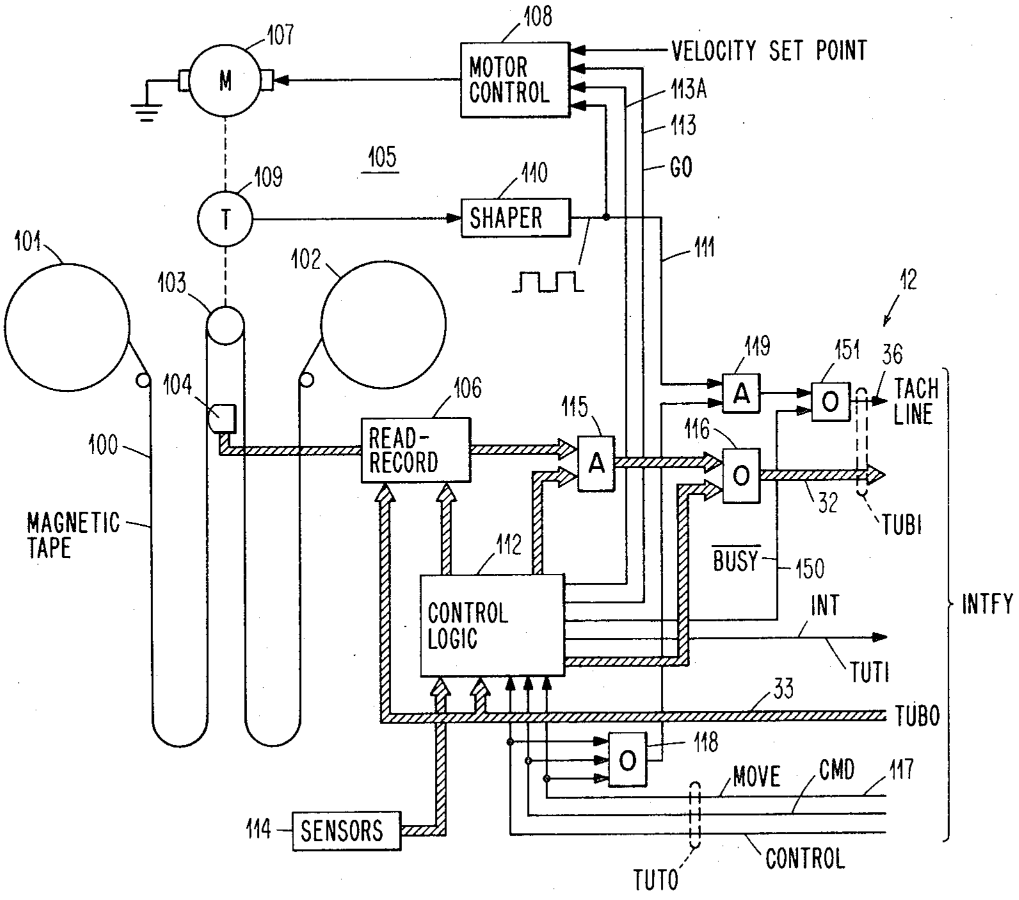
FIG. 4 is a simplified diagrammatic presentation of a tape drive (MTU) operable with the FIG. 3 illustrated CU.

Referring to FIG. 6Y, as soon as MPUY is trapped, it decodes the DMR command and enters routine 168. In that routine, it first sets up its program link at 227 and then looks for MPUX STAT C in decision step 228. If STAT C has not been set, it then drops the move tag at 229. Since STAT C was set by MPUX, it performs step 230 which sets the MOVE tag to the addressed MTU. This instructs the MTU to start moving the tape. At step 227, it also sets up circuitry for receiving the tach signal 186 as a branch condition in the MPUY branch control 79 via line 36 (FIGS. 3 and 4).

Since data is to be transferred to CPU for each transition, it is not necessary that the polarity be tracked as in the IBGM routine. MPUY microprogram (FIG. 6Y) enters the tach toggle routine 231 which is similar in operation to the STAT A toggle of the IBGM. The status of the toggle is changed upon the detection of a change in tachometer signal 186 polarity, i.e., a transition has been detected. In step 232, MPUY checks whether or not a transition has been detected as indicated by the toggle routine 231 changing state. First, it will be assumed that the transition has not been detected. The microprogram, at step 233, will set up the toggle bits in LSR 75 for the routine 231 sensing. This is equivalent to setting STAT A for the toggle 187–179. Then, in step 234, MPUY checks its STAT A which is also used as a toggle STAT. If STAT A is a binary 1, stop signal (STAT D) from MPUX is checked in 235. If MPUX STAT D is on, then a CMDO has been received from CPU. If the stop is on, MPUY then performs the previously described step 196. Usually, the stop will not be on; and step 236 is performed. This transfers the byte to MPUX via register YB. The MPUY STAT B is toggled in the same manner that STAT A was toggled in IBGM.

Assuming next that a transition in tach signal 186 was detected, the branch from step 232 effects a count at 240. Then, at 241, the modulus of the count is checked. If it has reached a predetermined value, the modulus of the registers 14 and 15 in LSR 75 had been reached; and then step 234 is started as previously described. If the counters are not full, step 231 is repeated.

Returning now to step 234, if MPUY STAT A is off, then the MOVE tag is checked at 243. If MOVE is off, then the stop decision step 235 is entered to see whether or not the MTU should be stopped. The MOVE tag checked in step 243 is in MPUY LSR 75 rather than the MOVE line connected to the addressed MTU. If the LSR MOVE tag is still active, the tachometer polarity is checked at 244. If it is minus polarity, the DMR routine is re-entered. If it is positive, STAT A of MPUY is set; and the DMR routine is re-entered.

The above-described MPUY microprogram is repeated through all of the DMR routine go-up, hold-over, and go-down times shown in FIG. 8. The supervisory control of the DMR execution by CU 11 is performed in MPUX microprograms. MPUX effects a minimum byte count to zero and then enters a microprogram loop which is re-entrant until a CMDO signal is received from CPU. In this manner, the number of bytes of information actually transferred to CPU is independent of the microprogram and need not be transferred through the channel to CU 11. This enhances the flexibility of the diagnostic procedures instituted in a tape subsystem.

error condition or marginal operating condition is merely logged; and the test exercise continued. By doing it in this manner, a more complete set of diagnostic data is made available for maintenance purposes.

The description of the CPU program in FIG. 9 is keyed to the microprogram of FIG. 6X through the entry and exit points. The FIG. 9 illustrated diagnostic program is entered by the programmer using DRMOTTST (drive motion test) in his JCL (job control language). This code word causes OS–360 to refer to the illustrated diagnostic program.

In step 276, CPU sends a channel command to CU 11 to obtain tachometer data for two revolutions of the tachometer. In the MTU used with the illustrated embodiment, this requires a byte count of more than 2,000—one byte for each one-half cycle of tachometer signal 186, there being 500 tach cycles per revolution. This tachometer data for two repeated mechanical motions of capstan 103 at full velocity is obtained by DMR routine 210 of FIG. 6X. Referring to FIG. 8, the supplied byte count includes a go-up count from T0 to T2 plus the 2,000 tach counts at full velocity in portion 215 of the velocity profile.

As soon as the tachometer data has been assembled in CPU, it is analyzed in subroutine 277. The first capstan revolution is checked. This check includes looking for lost tachometer transitions. This check is accomplished by checking for elapsed time measurements exceeding the known tolerances of the tach cycle. For example, if the elapsed time between two transitions is equal to two cycles, then a tachometer transition has been lost. In such a situation, CPU logs "bad tach" at 278 which indicates that the tachometer disk, that is, the light member, has either a dark spot or an erased line of some sort. The CPU then causes this information to be typed out in a maintenance log.

An asymmetry analysis is also performed; that is, elapsed times between successive transitions are compared with other elapsed times and with the specification for the asymmetry tolerances of a given tachometer system. If the tach signal is severely asymmetrical, CPU indicates at 279 that either the motor control or motor may be marginally operating.

Upon completing the analysis of the first tach or capstan revolution, the second revolution tach signal 186 is similarly analyzed. Then, correspondence between characteristics of the signals from the two revolutions are checked. If the same signal perturbation is detected in both revolutions, a bad tachometer plate or disk is indicated; however, if such signal perturbations are intermittent (not found in both of the successive measurements), or if there are lost portions of the tach signal that are different in the first and second capstan revolutions, a bad electrical system is indicated at 280. A velocity analysis is also performed in that elapsed time between successive transitions indicates a predetermined distance of travel. If velocity is slow, a bad motor is indicated at 281. Also, a bad motor control could cause excessive velocity deviations.

Next, the CPU in the FIG. 9 flow-charted program issues a CMDO signal together with a CCW (U.S. Pat. No. 3,336,582) causing a DMR to be executed for measuring go-up and go-down times. Referring momentarily to FIG. 8, the velocity profile 214 is generated as described from time T0 to T4. If desired for analytical purposes, that profile could be repeated several times. For a single DMR, CPU uses a predetermined number of byte counts, for example, 50 for go-up and 50 for go-down. When the byte count is zero, CPU sends a CMDO to CU 11 terminating the DMR. CPU then proceeds to analyze the go-up and go-down data at 285.

In subroutine 285, CPU checks go-up time—that is, from T0 to T1 in FIG. 8. If the time is too long, a bad motor control is indicated at 279. Then, go-holdover is checked. This represents the elapsed time from T1 to T2. It will be remembered that this is set up by CPU for a predetermined time in accordance with a byte count supplied to CU 11. If the go-up time is in specification, then there is a remaining time in accordance with the remaining byte count whereat MTU operates at full velocity. This action is referred to as go-holdover. If this time is within predetermined specifications, then the logic in the MTU is okay. If not, a logic error is indicated at 287. Upon completion of this analysis, the CPU may print out that the tachometer system, if checked within specification, is operating in a normal and expected manner. CPU then proceeds to IBG check 272.

Before the IBG is checked, one or more IBG's are generated following CPU instructions generated in step 290. This action consists of chained channel commands to CU 11 from CPU. Initially, a 400-byte record may be written. An IBG is generated and a second 400-byte record is written, etc., until an appropriate number of IBG's have been generated. This type of operation is well known and is not further described for that reason. Then, in step 291, CPU commands CU 11 to cause MTU to reposition to the first written record. When this is completed, CU 11 supplies a SUPPRI (suppressible request in) to CPU requesting the next command. CPU branches on this SUPPRI for obtaining IBGM data at 292. To do this, CPU issues a CMDO, together with a CCW initiating the IBGM micro-routine 210 shown in FIG. 6X. The IBG measure data is transferred from MTU through CU 11 in accordance with the description of FIGS. 6X and 6Y. CPU logs this data until all of it has been received. Then, CPU analyzes IBGM data at 293. In one mode of operation, the initial tachometer count, i.e., from EOR to the first positive transition, is discarded. Next, CPU averages the value of all the full tachometer durations and calculates the partial tachometers by adding the first and last values received. CPU then divides the last calculated value by the average tachometer cycle duration for indicating the number of partial tachometer signals received. Then, the net value is added to the total number of tachometer signals received to yield the gap size in tachometer signal cycles. Then, the tach distance is multiplied by the number of tachs received for giving the gap size in inches. It then compares the gap size in inches with a specification of IBG's for each IBG measured.

For each IBG measured, the total gap distance is divided by the elapsed time as measured by the CU 11 count which yields velocity. The two types of parameters analyzed in step 293 are IBG length and velocity. In decision step 294, CPU determines whether or not all of the IBG's have been measured and analyzed. If not, steps 292 and 293 are repeated until the programmed number of IBG's has been successfully measured and analyzed.

CPU Creep Measure Routine

During recording and re-recording, the actual position on the magnetic media of the record block may tend to move. This is called "creep." In step 274, CPU can analyze creep data based upon writing and rewriting various data blocks as above described. Creep is reflected by variations in IBG length. The first IBG length is memorized and retained in the CPU. Then, the IBG size of all downstream (later measured) IBG's is compared with the first measured one. If the downstream IBG's have lengths less than the first IBG, the CPU prints out that the MTU being analyzed has a negative creep characteristic. The absence of the message indicates a positive creep characteristic. A negative creep characteristic tends to reduce the size of the IBG and, therefore, increases the future possibility of missing data and causing readback errors. A positive creep merely increases access time. Checking creep can be used to adjust the MTU's to minimize access times by maintaining IBG lengths within a predetermined variation of an initial IBG.

CPU DMR Routine

Next, in routine 273, CPU initiates DMR routine 210 (FIG. 6X) for obtaining DMR data shown in FIG. 8 as the velocity profile 214. DMR is repeatedly performed a predetermined number of times. In obtaining DMR data at 299, CPU first commands the addressed MTU to reposition to the first record written in step 290. It then forward spaces a record twice. It may be recalled that a FSR causes the MTU to move the tape across one block of record signals. It then causes a BSR to be performed. Then, it measures the go-down time (GDT delay and writes a 400-byte record. This is done until the last GDT has been performed (last repeat of the function being analyzed) as detected in step 300. If the last GDT has not been performed, it returns and performs step 290 repeating the IBG check as shown. Upon completion of the last GDT, RA routine 275 is performed.

CPU Read Access (RA) Routine

In the first step 301 of routine 275, CPU commands CU to write three records on the tape in the addressed MTU and then repositions to the first record. CPU in step 302 obtains one RA measurement. This is performed by moving tape with an FSR, perform a GDT delay, and initiates RA micro-routine 211 in FIG. 6X. CPU in step 303, following the receipt of RA time as above described, calculates the RA time in milliseconds. It then compares the millisecond RA time with preset specifications. If the RA time is too long and the previous checks have indicated a motor, motor control, etc., are operating properly, tape slip is indicated at 304. Based upon prior maintenance practices, tape slip is corrected after CPU prints out the malfunction. Usually, RA will be within specification. If so, CPU causes a FSR to be performed, a BSR to be performed, and then performs a GDT delay and initiates a RA microprogram 211. It then causes a BSR and calculates the backward read access time. It then checks this RA time in milliseconds with predetermined backward read access time specifications. Tape slip could be indicated in the backward direction. Usually the RA will be within specification. It then fetches the next go-down time delay which is the time that the MTU will cause the tape to be moving in flat region 215 of velocity profile 214 in FIG. 8. Last, CPU determines whether or not the last GDT has been performed in step 305. If it has been performed, it then returns to OS–360. If not, the RA is again measured until the programmed number of RA measurements have been performed.

CPU Summary

The above-described FIG. 9 illustrates the utilization by a CPU of performance indicating signals generated by combining readback signals and tachometer signals from an MTU in a CU. Because of the flexibility afforded by the microprograms and the ability of the CPU to initiate functions performed by such microprograms and then be freed for other operations, it enables efficient utilization of machinery for concurrently analyzing MTU performance while data processing operations may be simultaneously performed. Certain situations may arise wherein the combination of the readback signals and a tachometer signal may be performed within a MTU with the performance indicating signals being further processed and possibly partially analyzed in an attached controller. Both such signals may be forwarded to a CPU for further analysis and maintenance logging purposes. Further, in practicing the invention insofar as methods of analyses are concerned, a separate unit may be provided for receiving the tachometer signals and the readback signals and combining same for combined signal presentation on a cathode ray oscilloscope, for example. In such a situation, manual operation of the MTU may provide sufficient operating capability for performance analysis. It is preferred that as much of the performance analysis as possible be performed automatically and in the manner above described.

While IBG's have been described with respect to certain American recording standards, IBG's may be generated in other manners. For example, instead of magnetizing the media in one polarity in accordance with the standards, a resync pattern of electrical signals may be recorded. Such a resync pattern could be strings of 1's, 0's, 01 pairs, and the like.

Test Forward Hitch (FIG. 11)

In the illustrated tape unit, a forward hitch is performed before a read backward operation if the previous operation was a write. This action prevents unwanted signals to be near record A.

CPU has a test forward hitch diagnostic as one of the peripheral diagnostic routines. The CPU program enters at 350 to set diagnostic mode in CU 11 at 351. The first operation at step 352 moves tape 180 to load point LP. Tape 180 is positioned such that the read gap R is at the downstream edge at LP as shown adjacent 352.

CU 11 informs CPU as soon as tape 180 has reached load point. CPU then causes step 353 wherein CU 11 writes two pseudo records A and B as shown to the right of step 353. Record A is the first downstream record and is written in accordance with either of the USA standards cited above. It consists of 250 signal bytes (can be all 1's except for parity). A "standard" IBG is formed between records A and B, with record B being about 5,000 signal bytes. Tape 180 is then again moved to load point at step 354. The system is now ready to test forward hitch.

A first IBG, IBG–1, is first formed by a later-described write operation, then measured with the measurement stored in a suitable register. Then, the tape is moved back to LP; and a second IBG, IBG–2, is formed and measured. IBG–2 is always longer than IBG–1, with the difference being the forward hitch distance. This difference is then compared with a threshold for determining the functionality of the forward hitch circuitry of the MTU under test.

IBG–1 is formed in step 355 wherein cpu commands CU 11 to write pseudo record A' equal to 250 bytes on tape 180. Upon completion of the write operation, the position shown to the right of step 355 is assumed by the tape. Note that the write gap W has caused erasure of part of downstream block B. This is normal tape processing operations. That is, the current for erasing tape 180 during a write operation continues until the tape is stopped. IBG–1 is then measured.

Tape 180 is then returned to load point, and a forward space record is commanded at step 356. As previously explained, before the tape 180 is stopped in IBG–1, an IBGM command is given at 357. This causes IBG–1 to be measured as aforedescribed with the tape stopping under read/write head in the downstream IBG at 358. Then, tape 180 is again moved to load point at 359.

In step 360, record A'' of 250 bytes is first written. Tape stops with the head in IBG–1. Then, read backward instruction is given with erase current on 361 forming IBG–2. Upon reversing tape direction, erase current is turned off and the read backward operation completed. After the read backward 361, the read gap is in the space between LP and record A''. Then, IBG–2 is measured as above described at 362. In step 363, CPU calculates the difference between IBG–2 and IBG–1 for determining the forward hitch distance—that is, the distance the tape 180 is first moved to the right as seen in FIG. 11 before it is moved to the left for backward reading record A''. Subsequent to step 363, CPU calculates whether or not the forward hitch distance meets performance requirements.

The above description shows another diagnostic procedure wherein IBG measurements utilize tachometer or motion indicating signals with record format signals for analyzing tape drive performance.

Reel-to-Reel Tape Drive Performance Analysis (FIG. 12)

In some reel-to-reel tape drives, there is no capstan associated with transporting the media 370 across the read/write/erase transducer 371. In such systems, which may be more sensitive to degradation of control circuits than a vacuum-column single capstan transport described with respect to FIG. 4, more elaborate diagnostic procedures may be required. Drive control system 372 can be mathematically modeled with the drive performance analysis measurements made in accordance with the present invention being compared with the mathematical model for analyzing degradation. The reason for this is that control 372 may contain a large plurality of feedback loops which interact in nonlinear manners. A mathematical model may be the only suitable way of analyzing tape drive performance. The FIG. 12 illustrated embodiment is simplified to the extent necessary to show how the combination of motion indicating signals with readback signals can be used in such a complex control environment.

Magnetic media 370 is selectively transported between first and second reels 373 and 374 without intermediate buffering loops of any significance. In order to ascertain media 370 velocity adjacent head 371, a clock sprocket or synchronization track 375 is recorded along the center of the media at the time of manufacture and is never changed in any subsequent tape processing. One of the gaps in head 371 senses the recorded signal in track 375 and supplies same to clock 376 for feedthrough to motor control 372. Motor control 372 is responsive, inter alia, to the sprocket signals for controlling media velocity past transducer or head 371. In this sense, the sprocket track 375 signals favorably compare with the digital tachometer signals supplied over line 36 in the FIG. 4 illustrated tape drive system. Accordingly, clock 376 supplies its sprocket signals over line 377 to other controls 378. These other controls, when compared with the FIG. 1–11 embodiments, include CU 11, CPU, as well as the functional controls or control logic 112 (FIG. 4), etc.

Other controls 378 combined the readback and displacement indicating (sprocket or tachometer) signals as described for the FIG. 4 illustrated drive—that is, signals read from media 370 are supplied through read circuits 380 to other controls 378 to be combined with track 375 sprocket signals for analyzing tape drive performance. With the formats described in the USA standards referenced at the beginning of this description, tape drive performance is subject to the same type of analysis as described for the FIG. 4 illustrated embodiment and for the diagnostics and other analytical procedures discussed above.

Additionally, the performance of the drive system for reels 373 and 374 is of increasing importance. In this regard, a pair of reel drive motors 381 and 382 have tachometers 383 and 384 generating digital signals as described for tachometer 109 of FIG. 4. These tachometer signals are supplied not only to motor control 372 for velocity and displacement controlling in the same sense as for the FIG. 4 embodiment, but also to other controls 378 for further combining with the readback signals supplied from circuits 380 plus the sprocket signals from track 375. It is appreciated that the CPU program and the microprograms in CU 11 will have to be more complex to accommodate these additional variables. Particularly, the mathematical model of motor control 372 preferably is lodged in a program within CPU for analyzing performance and indicating degraded performance areas. For example, in the start-up procedures for the FIG. 12 illustrated drive, not only must the quality of the tachometers 383 and 384 be analyzed, but also the quality of readback from sprocket track 375.

Other controls 378 have write circuits 387 to record signals on tape 370.

In analyzing performance of the FIG. 12 illustrated drive in accordance with the present invention, the procedure set forth with respect to the capstan pulses from FIG. 4 are comparable with the sprocket signals from track 375. Additionally, similar diagnostics can be performed by combining tachometer signals from take-up reel 374 tachometer 384 with the readback signals. Similarly, for the pay-out reel 373, tachometer 383 signals are combined with readback signals for that portion of the drive. Accordingly, not only is the mathematical model of motor control 372 important in generating tape drive performance measurements, but also selected portions of the drive with respect to readback signals on the tape are separately analyzed. Pseudo records can be written on media 370 for analyzing reel-to-reel performance. Such further diagnostics are not included in this description as many reel-to-reel drives will vary substantially with the principles of the invention being practiced by a thorough reading and study of the present description.

Another version of the present invention as applied to reel-to-reel drives is that the tachometer signals from 384 are combined with the sprocket signals from track 375 for analyzing acceleration and deceleration characteristics independent of any tape format. Sprocket signals from track 375 are then considered as readback signals for this limited application. Accordingly, it is seen that when a sprocket track is recorded on media 370, it can be used in many different ways for analyzing tape drive performance. The sprocket track, however, can not be used to the extent that the readback signals from the data format because the various hitch operations are not as easily and readily analyzed as described herein.

While preferred embodiments of the invention have been shown and described herein, it is to be understood that the invention is not limited to these embodiments or their details, and that departures may be made therefrom within the spirit and scope of the invention as defined in the appended claims.

What is claimed is:

1. Moving media analysis, including receiving tachometer signals from a driving apparatus used to effect relative movement between such media and a transducer, said signals having predetermined changes indicative of driving apparatus operation, simultaneously receiving data-like signals from such media which were recorded in a predetermined block format having IBG's (interblock gaps), and combining such readback signals and tachometer signals in a given relationship for indicating performance of said driving apparatus with respect to said format.

2. Analysis as set forth in claim 1 wherein said tachometer signals repeatedly change between two signal states for indicating driving apparatus operation, and said combining further including metering elapsed time between selected portions of said data-like signals, then establishing a count of changes in state of said tachometer signals during such elapsed time, and then comparing said elapsed time with said count for indicating quantitative driving apparatus performance.

3. Analysis as set forth in claim 1 including detecting blocks of signals bracketing a first IBG, counting the number of tachometer signal changes received between detection of two adjacent blocks defining said first IBG, comparing said count with a set of threshold numbers, and supplying an indication of the relationship of said count with said threshold numbers.

4. Analysis as set forth in claim 1 further including:

stopping said media in a supposed predetermined relationship with a block of said data-like signals recorded on said media, moving said media in a first direction a distance for a predetermined number of tachometer signal-state changes, reversing the direction of media motion and counting the number of tachometer signal changes until detection of said block of data-like signals, and comparing said count with another number for evaluating actual location with said supposed location.

5. Analysis as in claim 1 for determining read access time in a magnetic media system, including:

starting media movement in a direction to access a given block of data-like signals from a predetermined distance therefrom, counting changes in said received tachometer signals, detecting said block of data, and analyzing said count between start and detection with respect to a desired access time.

6. Analysis as set forth in claim 1 further including the following preliminary sequence of operations:

firstly, operating said driving apparatus while receiving said tachometer signals without regard to said readback signals for a plurality of driving apparatus repeated operations, analyzing said tachometer signals to verify proper driving system operation including a portion thereof relating to generation of such tachometer signals, secondly, recording a first plurality of blocks of signals separated by IBG's of predetermined characteristics, and thirdly, repositioning the media at a start read position with respect to a selected one of said blocks and then performing the claim 1 recited steps.

7. Analysis as set forth in claim 6 wherein said first operation includes operation of a rotatable media driving capstan for two revolutions, data concerning said two revolutions being respectively logged in corresponding data tables in accordance with signal characteristics of said tachometer signals, comparing data in said corresponding positions and with threshold values concerning acceptable limits of said characteristics, and logging coincidences of unacceptable data values in both tables as indicia of a first class of possible malfunctions, logging unacceptable data values in one of said tables but not in a corresponding position in another table as a second class of possible malfunctions, and logging a third class of malfunctions when another characteristic limit has become unacceptable.

8. Analysis as set forth in claim 6 further operating said driving apparatus during said first operation at a supposed constant velocity, said tachometer signals having a periodic function and comparing characteristics of said tachometer signal in successive ones of said periodic functions for variations of said characteristics, and logging a driving apparatus control malfunction when said variations exceed a threshold set for said constant velocity.

9. Analysis as set forth in claim 6 wherein a given go-up tachometer count is used to start and maintain a given velocity in said driving apparatus until a number of tachometer signal changes represented by said count has been received, then stopping the driving apparatus by counting tachometer signal changes received until the driving apparatus has stopped.

10. Analysis as set forth in claim 9 wherein during said go-up count, readback signals are being sensed and upon receipt of a readback signal, logging the number of tachometer signal changes that have been received.

11. Analysis as set forth in claim 9 wherein elapsed time to reach the go-up count is measured and compared with a threshold for verifying operations of logic circuits used to effect a go-holdover function in said driving apparatus.

12. Analysis as set forth in claim 6 wherein a plurality of said IBG's is measured by successively detecting ends of upstream blocks and beginning of the next respective downstream blocks and counting and logging tachometer signal changes therebetween, and then comparing said logged counts and indicating performance as a function of count variations between said IBG's.

13. Analysis as set forth in claim 12 wherein said comparison is subtracting a downstream IBG count from an upstream IBG count and indicating a negative creep characteristic existing in said performance when the result has a negative sign.

14. Analysis as set forth in claim 1 wherein said tachometer signal-state changes are counted for the duration of a block of said data-like signals, and comparing said count with a record characteristic for evaluating displacement of media with respect to desired thresholds of said record characteristic.

15. Analysis as set forth in claim 1 including effecting a plurality of relative movements between said media and transducing at least one movement of which has a duration in accordance with a predetermined number of changes in said tachometer signal.

16. Analysis as set forth in claim 15 wherein a plurality of signal blocks is recorded on said media separated by IBG's, said media and transducer relatively repositioned near the first recorded block, and performing a plurality of successive operations using both readback signals and tachometer signals for measuring performance of each successive operation as well as the block recording operation.

17. Analysis as set forth in claim 15 further comparing performances of said successive operations to detect variations in recorded signal format for indicating an additional performance characteristic.

18. The method of operating a media transport subsystem adapted to exchange signals with a controlling data processing system for recording and reproducing digital data signals on and from a record media, the improved method including in combination:

operating a media transport device in accordance with media-head relative displacement indicating signals generated during relative motions between media and head which are indicative of a driving means operational performance, in a selected device, generating such relative motion for media having digital signals recorded thereon in accordance with normal established data processing recording formats, reproducing said recorded digital signals to generate format indicating signals and simultaneously supplying said displacement indicating signals along with said format signals in a related manner, and combining said format and said displacement indicating signals for indicating transport subsystem performance with respect to operation thereof in said established data processing recording format.

19. The method set forth in claim 18 plus recording said digital signals on a media in said selected device while receiving said displacement indicating signals and combining displacement indicating signals received during recording with digital signals being recorded as an indicia of media transport subsystem performance during recording.

20. The method set forth in claim 18 plus transferring said combined signals to a central processing unit (CPU), combining said combined signals in said CPU with a program of instructions organized in accordance with predetermined functional characteristics of said media transport subsystem for generating signals directly indicative of the performance of said tape subsystem for indicating possible malfunctions, marginal operating conditions, satisfactory operating conditions, and the like.

21. The method set forth in claim 20, further recording first and second blocks of data signals separated by a gap (IBG) having a predetermined number of recording positions along the length of the media, operating a recording clock during said IBG, using said displacement indicating signals to meter the IBG length and then comparing the displacement indicating signal count with said clock signal count for indicating the relationship between write clock frequency and media velocity.

22. The method set forth in claim 18 plus recording two blocks of data signals separated by a gap (IBG) of supposedly predetermined dimensions in accordance with a write clock controlled operation, backspacing the tape beyond said IBG and then moving the tape in the forward direction while simultaneously metering the length of the IBG using displacement indicating signals received intermediate the end of one of said data blocks and the beginning of another one of said data signal blocks, and then comparing the supposed dimensions with the tachometer metered dimensions for indicating tape subsystem IBG generation performance.

23. The method set forth in claim 18 wherein the media transport device has a capstan and capstan drive system for transporting media past a transducing station adjacent the capstan, obtaining said displacement indicating signals from said capstan drive system as tachometer signals whereby media transport performance adjacent said station is measured.

24. The method set forth in claim 18 wherein said media transport device is operated to stop media such that a gap (IBG) is in transducing relation to a transducing station, signals being recordable on said media in blocks separated by such IBG's, initially causing said transport to space a first record by moving from one IBG to a second IBG, before the block being spaced leaves said station, initiating an IBG measure operation to abort said space record operation, measuring said second IBG, and spacing another record to stop the media such that a third IBG is in said station.

25. The method set forth in claim 24 further measuring elapsed time from starting media transport until said media is being transported at a predetermined velocity as indicated by said displacement indicating signals or said first record is detected and, in either case, causing said transport to continue media transport a predetermined number of byte positions thereafter and combining said displacement indicating signals and readback signals from said first record during said predetermined number of byte positions.

26. The method set forth in claim 25 further issuing a stop media command after said media has been transported said predetermined number of byte positions, measuring stop time, causing said media to remain stopped a predetermined time, and restarting said media to repeat the claim 25 stated functions.

27. The method set forth in claim 25 wherein said drive has a go-holdover function, the method further including measuring the number of displacement indicating signals received between said stop command until the media transport velocity begins decreasing.

28. A media transporting device having media transporting means with a digital tachometer, record/reproduce means adapted to be operatively associated with media in the device, a set of first bus lines for transferring signals to a controlling unit (CU), and second bus lines for receiving command and data signals from a CU, control means for actuating the media transporting means in response to command signals to operate at a predetermined media velocity, a velocity control loop receiving said tachometer signals for supplying velocity control signals to said media transporting means for controlling same to move the media at said predetermined media velocity, and said control means being further responsive to certain ones of said command signals to simultaneously supply to further lines tachometer signals in a simultaneous manner with data signals read from media in said device.

29. The device set forth in claim 28 wherein said certain ones of said command signals indicate a media motion combined with a signal transfer operation with respect to said media and said control means being responsive to other command signals to block said tachometer signals from said second bus lines.

30. The record media transport device set forth in claim 29, wherein, said velocity control loop controls said media velocity independent of signal transfers between said record/reproduce means and said bus lines and supplying said tachometer signal as a succession of state changes between discrete signal states such that when said reproduce means supplies signals to said first bus lines the relationship of said supplied signals to said succession of state changes indicates quality of operation of said transport means including said velocity control loop as measured in the time domain.

31. The device set forth in claim 28 wherein said control means generates a "go" signal activating said media transporting means, said digital tachometer supplying said tachometer signals to one of said first bus lines whenever a "go" signal is being supplied.

32. The device set forth in claim 31 wherein said media transporting means has a velocity set point means connected to one of said second bus lines for receiving velocity controlling signals from the CU.

33. A record media transport device for recording and reproducing digital data signals in response to command signals received over TUBO and TUTO lines, sending data-like signals reproduced from a media over TUBI input lines while simultaneously sending control signals to a controller (CU) for recovery of data from said tape signals over TUBI input lines in accordance with an operation being performed and the signals supplied over TUBI, media driving means including tachometer means supplying tachometer signals which operate the media driving means in accordance with a predetermined velocity and simultaneously indicate media driving means performance, the improvement including the combination:

control means in said device responsive to said command signals for supplying said tachometer signals over one of said input lines, and means responsive to said control means to simultaneously send signals reproduced from said media over said TUBI input lines whereby said driving means performance relative to said data signals is supplied to such controller for analysis.

34. The device set forth in claim 33 wherein said device records data signals in accordance with normal established data processing procedures and said simultaneously supplied produced signals are in a format used in normal data processing operations.

35. The device set forth in claim 34 further including an electrical receiving connection between said TUTO lines and said tape driving means for receiving digitized oscillator signals, said tape driving means being responsive to said digitized oscillator signals to move media at a corresponding velocity.

36. The device set forth in claim 34 wherein said media transporting means has a rotatable capstan for transporting said media past a transducer, said tachometer means including a tachometer member having a predetermined number of discrete position indicating indicia corresponding to one revolution of said rotatable capstan, signal generation means responsive to rotation of said tachometer member to produce tachometer signals in accordance with said indicia during said rotation, said signals being of multistate type having predetermined signal amplitudes and in a noslip condition between capstan and media indicating media transport, said read/record means digitizing signals read back from said media, and said control means causing transfer of said multistable state tachometer signals and said digitizing readback signals to TUBI on a time-coherent basis.

37. A data processing system including:

a plurality of magnetic tape units (MTU's) each having a tape driving motor with a tachometer supplying tachometer signals indicative of motor rotation and record/read circuits for processing information-bearing like signals to and from a tape in said unit in accordance with a predetermined block type of format of record signals on the tape, a control unit (CU) automatically connectable to any one of said MTU's for receiving tachometer signals and signals recorded on a tape from said one MTU in accordance with said format, and means in said CU metering time in accordance with said tachometer signals during selected portions of said information-bearing like signals for indicating MTU performance with respect to said selected portions of the format.

38. The data processing system set forth in claim 37 wherein said CU has first means responsive to said received tachometer signals to indicate quality thereof, record means jointly responsive to said tachometer signals and said readback signals to indicate a performance relationship between recorded format on the tape, said tachometer signals and predetermined thresholds of such performance relationship.

39. The data processing system of claim 38 wherein said CU has a control memory, an LSR memory, an ALU, branch control means, and sequence means for sequencing sets of instruction words in said control memory to effect selectable program functions, means digitizing said tachometer signals to alternate between different signal states, said program functions including activating said branch control means to ascertain signal-state changes in said digitized signal, data flow circuits in said CU responsive to said readback signals for generating data state signals indicating detection of recorded signals and gaps between recorded signals, and further program functions including said metering time means being jointly responsive to said data state signals and said signal-state changes to generate numerical indications of predetermined relations therebetween related to MTU performance.

40. The data processing system of claim 39 further including calculation means responsive to said numerical indications and a set of threshold numbers to calculate marginal operating characteristics and for indicating replacement requirements on one of said MTU's.

41. The data processing system of claim 39 wherein one of said program functions includes motion control command signal generation, said one program function effecting stopping tape in one MTU, starting tape, and another program function effecting counting received tachometer signal-state changes until occurrence of a predetermined event, and means having threshold values receiving said count of received tachometer signal-state changes for comparison with said threshold values.

42. The method for performance analysis for a plural unit system including an operating unit and a controller, the method including the steps of:

causing said operating unit to send first signals to said controller indicative of performance in the time domain of a first portion of said operating unit, simultaneously causing the same operating unit to send second signals to the controller which were generated as a result of operations of said first portion with another portion of said operating unit, and combining said first and second signals in a predetermined manner in said controller for indicating performance of said operating unit in the time domain.

43. The method of claim 42 further causing said controller to produce third signals during said simultaneous generation of said first and second signals and generating a fourth signal based upon the combination of said first, second, and third signals for representing performance of a given function by said operating unit in the time domain.

44. The method of claim 43 wherein said third signal indicates a number of controller timing signal changes occurring during a selected time portion of the generation of said first and second signals.

45. The method of claim 43 further causing said operating unit to send said first signals until a predetermined number of said first signals has geen generated and then comparing the number of said second signals with said first signals.

46. The method of claim 42 wherein said another portion is operative to produce second signals only during a portion of the time said operating unit is sending said first signals, and comparing ones of said first signals sent in the absence of said second signals with a threshold signal and indicating whether or not said threshold signal was exceeded.

47. Performance analysis as set forth in claim 42 wherein said second signals are combined together to indicate performance successive checkpoints, combining said first signals with said checkpoint signals to indicate time relationships between successive ones of said checkpoints whereby repeated functions can be analyzed for consistency in performance.

48. Performance analysis as set forth in claim 47 wherein said operating unit is a media transport (MTU) and EOR and BOB signals indicate signal format checkpoints with an IBG existing between each set of successive ones of said EOR and BOB signals, said first signals being displacement indicating signals from said operating unit, measuring successive ones of said IBG's by combining said EOR, BOB, and said displacement signals, and combining said measurements for indicating positive or negative creep characteristics in said unit.

49. Performance analysis as set forth in claim 47 wherein said operations and data processing operations include transfer of data indicia between signal processing means and a media, generating said first signals from said first portion while effecting a relative motion between said media and said signal processing means such that said first signals represent a supposed relationship between such relative motion and transfer of the indicia, and after combining said first and second signals, comparing the combined signals with threshold signals for indicating operating unit performance with performance thresholds represented in said threshold signals.

50. Performance analysis as set forth in claim 49 wherein said first signal is a digital signal having signal-state changes spaced in accordance with said relative motion, and operating said controller in a manner to receive and process said record signals while altering controller operation in accordance with said signal-state changes such that the time relation between said relative displacement and said second signals is indicated.

51. A signal processing system including a first unit having a mechanical motion, a motive system effecting said motion and means for producing displacement indicating signals indicative of such motion, said first unit being responsive to first command signals to perform independent operations including effecting said motion and responsive to other command signals to produce other signals with respect to a data processing function performable in said first unit in a supposedly coordinated relationship with respect to said motion, a second independently operable unit connected to said first unit for supplying said command signals to said first unit and receiving said displacement indicating and other signals, and said second unit being jointly responsive to said displacement indicating and other signals to indicate performance of said first unit in providing said motion and with respect to other functions and to said displacement indicating signals for analyzing performance of said means.

52. A data processing subsystem for exchanging signals with another system, and adapted to effect relative motion between a record member and a transducer for data transfers therebetween, the improvement including the combination:

first means repeatedly establishing indicia of said relative motion, second means repeatedly establishing indicia of said data transfers, and third means jointly responsive to said indicia to generate corresponding sets of digital data signals representative of the operational relationships between said indicia and further operative to compare said sets of digital data signals with sets of threshold digital data signals for indicating quality of performance.

53. The method of operating a data processing system including device mechanical and electrical functions for measuring and analyzing such device performance, the device being responsive to command signals to effect mechanical translation of a device member and supplying digital electrical signals indicative of such translation, the device being further operative to perform electrically stimulated functions in supposed coordinated relationship with said translation, the improved method including the steps in combination:

the first step of initiating and analyzing said translation by repeating two supposedly identical translations, receiving digital representations thereof, and comparing same with thresholds represented by digital numbers and comparing digital representations of the two translations for identity within a given range of digital numbers, the second step of initiating and repeating said electrically stimulated functions a predetermined number of times with a corresponding set of mechanical translations, the third step of repeatedly receiving digital signals representative of the relationship of said electrically stimulated functions and said corresponding translations during performance of all said repeated electrically stimulated functions, the fourth step of repeatedly comparing received digital signals with digital signals lodged in said data processing system as threshold signals and indicating the relationship therebetween as maintenance pointers, and then repeating said second through fourth steps a predetermined number of times.

54. The method of analyzing a recorded block of signals on a magnetic media, causing relative motion between said media and a transducer for transducing operations, detecting said block of signals, then metering and indicating relative movement until said block of signals is no longer being detected via said transducer, combining a representation signal related to said recorded signals and said indication to ascertain the block length on said media; and comparing said ascertained block length with a threshold length of said block of signals to determine whether or not said block length is proper.

55. A peripheral device adapted to be connected to a data processing subsystem for exchanging signals therewith and including means for effecting relative motion between a record member and an operating member for enabling data signal transfers therebetween;

the improved peripheral device including in combination:

first means supplying indicia of said relative motion;

second means supplying indicia of possible signal transfers between said operating member and said record member; and third means jointly responsive to said indicia to indicate the operational relationship between said relative motion and said data signal transfers, and comparing same with a digital threshold for indicating proper operation of said device in effecting said relative motion.

56. A record media transport device for recording and reproducing digital data signals in response to command signals received over TUBO and TUTO signal paths, sending data-like signals reproduced from a media over TUBI input signal paths while simultaneously sending control signals to a controller (CU) for recovery of data from said tape signals over TUBI input signal paths in accordance with an operation being performed and the signals supplied over TUBI, driving means effecting relative motion between an operating member and record media and including tachometer means supplying tachometer signals which operate the driving means in accordance with a predetermined velocity and simultaneously indicate media driving means performance;

the improvement including the combination:

control means in said device responsive to said command signals for initiating operation of said driving means for effecting said relative motion and supplying said tachometer signals over one of said input signal paths; and means responsive to said control means to simultaneously send signals derived from said media over said TUBI input signal paths whereby the relationship of said derived signals to said supplied tachometer signals may indicate quantitative performance of said driving means.

57. An error indicator for an operating unit adapted to be automatically controlled and including means effecting a relative mechanical translation between an operating member and another member;

means indicating said translation;

signal processing means operatively associated with said operating member for repeatedly effecting signal exchanges therewith in a supposed coordinated relationship with said relative mechanical translation;

counting means for counting said signal exchanges; and comparison means jointly responsive to said indicating means and said counting means to indicate errors whenever said counting means effects counts with respect to said relative translation indications outside a given range of acceptable coordinated operations.

58. An operating unit adapted to be connected to a controlling unit in a subsystem employing plural ones of said operating units, said operating unit independently controllable by said controlling unit and including means causing an effective mechanical translation between an operating member and a record member, and means effecting electrically stimulated functions relating to data representations recordable on a record member, said operating member responsive to said electrically stimulated functions to effect exchange of said data representations with said member in a supposed coordinated relationship to said mechanical translation;

translation indicating means responsive to said effective mechanical translation to indicate operation thereof in the time domain as a succession of changes in an electrical signal;

signal supplying means responsive to said operating member and to indicate performance of said electrically stimulated function as a succession of changes in an electrical signal; and means operatively associated with said indicating means and said supplying means for transferring signals from said operating unit indicative of relative performance of said mechanical translation means with respect to said means effecting said electrically stimulated function.

* * * * *